US009348800B2

(12) United States Patent
Audet

(10) Patent No.: US 9,348,800 B2
(45) Date of Patent: *May 24, 2016

(54) METHOD OF MANAGING ARRAYS OF DOCUMENTS

(71) Applicant: 9224-5489 QUEBEC INC., Montreal (CA)

(72) Inventor: Mathieu Audet, Montreal (CA)

(73) Assignee: 9224-5489 QUEBEC INC., Montreal (CA)

( * ) Notice: Subject to any disclaimer, the term of this patent is extended or adjusted under 35 U.S.C. 154(b) by 47 days.

This patent is subject to a terminal disclaimer.

(21) Appl. No.: 14/192,481

(22) Filed: Feb. 27, 2014

(65) Prior Publication Data

US 2014/0181649 A1    Jun. 26, 2014

Related U.S. Application Data

(63) Continuation of application No. 12/168,118, filed on Jul. 5, 2008, now Pat. No. 8,701,039.

(60) Provisional application No. 60/957,444, filed on Aug. 22, 2007, provisional application No. 60/971,214, filed on Sep. 10, 2007, provisional application No. 61/034,625, filed on Mar. 7, 2008.

(51) Int. Cl.
*G06F 17/21* (2006.01)
*G06F 3/0481* (2013.01)
(Continued)

(52) U.S. Cl.
CPC ............ *G06F 17/211* (2013.01); *G06F 3/0482* (2013.01); *G06F 3/0485* (2013.01);
(Continued)

(58) Field of Classification Search
CPC ... G06F 3/0482; G06F 3/0481; G06F 9/4443; G06F 3/04817; G06F 17/211; G06F 17/24; G06F 3/0485; G06F 3/1208; H04N 5/44543
USPC ......................................... 715/810, 277, 243
See application file for complete search history.

(56) References Cited

U.S. PATENT DOCUMENTS 4,616,336 A   10/1986   Robertson
4,653,021 A    3/1987   Takagi
(Continued)

FOREIGN PATENT DOCUMENTS

JP    07-013971    1/1995
JP    07-085080    3/1995
(Continued)

OTHER PUBLICATIONS

The lifestream approach to reorganizing the information world; Nicolas Carriero, Scott Fertig; Eric Freeman and David Gelernter; Apr. 1995; Yale University.
(Continued)

*Primary Examiner* — Jung-Mu Chuang
(74) *Attorney, Agent, or Firm* — Mathieu Audet

(57) ABSTRACT

The present application provides a method and an information organizing system thereof for discriminating axes of documents on a display, the method comprising displaying, at a first time about an time-of-axis-display timeline substantially aligned with a depth of view of the display, a first axis of documents substantially rectilinearly displaying documents along a first chronological order thereof; and displaying, at a second time about the time-of-axis-display timeline, chronologically following the first time about the time-of-axis-display timeline at which the first axis of documents was displayed, a second axis of documents substantially rectilinearly displaying documents along a second chronological order thereof, the second axis of documents being displayed at the second time along the time-of-axis-display timeline with a lesser depth of view than a depth of view with which the first axis of documents is displayed at the first time about the time-of-axis-display timeline, whereby the first axis of documents and second axis of documents are concurrently displayed about the time-of-axis-display timeline in such a way as to graphically indicate to a viewer of the display that the first axis of documents was displayed chronologically before the second axis of documents is displayed.

20 Claims, 11 Drawing Sheets

(51) Int. Cl.
*G06F 3/0482* (2013.01)
*G06F 3/0485* (2013.01)
*G06Q 10/10* (2012.01)
*G06F 17/30* (2006.01)

(52) U.S. Cl.
CPC ...... *G06F3/04815* (2013.01); *G06F 17/30011* (2013.01); *G06F 17/30716* (2013.01); *G06F 17/30994* (2013.01); *G06Q 10/109* (2013.01)

(56) References Cited

U.S. PATENT DOCUMENTS

| | | | |
|---|---|---|---|
| 4,817,036 | A | 3/1989 | Millett et al. |
| 5,101,500 | A | 3/1992 | Marui |
| 5,115,504 | A | 5/1992 | Belove |
| 5,148,154 | A | 9/1992 | MacKay |
| 5,241,624 | A | 8/1993 | Torres |
| 5,261,087 | A | 11/1993 | Makaino |
| 5,353,391 | A * | 10/1994 | Cohen et al. ............... 345/619 |
| 5,388,197 | A | 2/1995 | Rayner |
| 5,398,074 | A | 3/1995 | Duffield |
| 5,414,811 | A | 5/1995 | Parulski et al. |
| 5,499,330 | A | 3/1996 | Lucas et al. |
| 5,524,195 | A | 6/1996 | Clanton |
| 5,535,063 | A | 7/1996 | Lamming |
| 5,537,524 | A * | 7/1996 | Aprile ............... 345/440 |
| 5,546,528 | A | 8/1996 | Johnston |
| 5,581,752 | A | 12/1996 | Inoue |
| 5,598,519 | A | 1/1997 | Narayanan |
| 5,602,596 | A | 2/1997 | Claussen |
| 5,606,374 | A | 2/1997 | Bertram |
| 5,621,456 | A | 4/1997 | Florin |
| 5,621,874 | A | 4/1997 | Lucas |
| 5,623,613 | A | 4/1997 | Rowe |
| 5,634,064 | A | 5/1997 | Warnock |
| 5,649,182 | A | 7/1997 | Reitz |
| 5,659,742 | A | 8/1997 | Beattie |
| 5,663,757 | A | 9/1997 | Morales |
| 5,671,381 | A | 9/1997 | Strasnick |
| 5,673,401 | A | 9/1997 | Volk |
| 5,677,708 | A | 10/1997 | Matthews |
| 5,680,605 | A | 10/1997 | Torres |
| 5,682,511 | A | 10/1997 | Sposato |
| 5,689,287 | A * | 11/1997 | Mackinlay et al. ............ 345/427 |
| 5,701,500 | A | 12/1997 | Ikeo |
| 5,713,031 | A | 1/1998 | Saito |
| 5,740,815 | A | 4/1998 | Alpins |
| 5,781,188 | A | 7/1998 | Amiot |
| 5,781,785 | A | 7/1998 | Rowe |
| 5,786,816 | A * | 7/1998 | Macrae et al. ............... 715/837 |
| 5,794,178 | A | 8/1998 | Caid |
| 5,798,766 | A | 8/1998 | Hayashi et al. |
| 5,812,124 | A | 9/1998 | Eick |
| 5,822,751 | A | 10/1998 | Gray |
| 5,832,504 | A | 11/1998 | Tripathi |
| 5,838,317 | A | 11/1998 | Bolnick |
| 5,838,326 | A | 11/1998 | Card |
| 5,847,707 | A | 12/1998 | Hayashida |
| 5,850,218 | A | 12/1998 | Lajoie |
| 5,878,410 | A | 3/1999 | Zbikowski |
| 5,880,729 | A * | 3/1999 | Johnston, Jr. ......... G06F 9/4443 715/823 |
| 5,900,879 | A | 5/1999 | Berry |
| 5,903,271 | A | 5/1999 | Bardon |
| 5,905,992 | A | 5/1999 | Lucas |
| 5,920,859 | A | 7/1999 | Li |
| 5,926,824 | A | 7/1999 | Hashimoto |
| 5,933,843 | A | 8/1999 | Takai |
| 5,974,391 | A | 10/1999 | Hongawa et al. |
| 5,977,974 | A | 11/1999 | Hatori et al. |
| 5,980,096 | A | 11/1999 | Thalhammer-Reyero |
| 5,982,369 | A | 11/1999 | Sciammarella |
| 5,999,173 | A * | 12/1999 | Ubillos ............... 715/724 |
| 6,003,034 | A | 12/1999 | Tuli |
| 6,005,601 | A | 12/1999 | Ohkura |
| 6,006,227 | A | 12/1999 | Freeman |
| 6,009,442 | A | 12/1999 | Chen |
| 6,012,072 | A | 1/2000 | Lucas |
| 6,020,930 | A | 2/2000 | Legrand |
| 6,023,703 | A | 2/2000 | Hill |
| 6,028,600 | A | 2/2000 | Rosin |
| 6,029,164 | A | 2/2000 | Birrell |
| 6,037,933 | A | 3/2000 | Blonstein |
| 6,038,522 | A | 3/2000 | Manson et al. |
| 6,061,062 | A | 5/2000 | Venolia |
| 6,064,384 | A | 5/2000 | Ho |
| 6,067,554 | A | 5/2000 | Hohensee |
| 6,081,817 | A | 6/2000 | Taguchi |
| 6,088,032 | A | 7/2000 | Mackinlay |
| 6,100,887 | A | 8/2000 | Bormann et al. |
| 6,108,657 | A | 8/2000 | Shoup |
| 6,111,578 | A | 8/2000 | Tesler |
| 6,119,120 | A | 9/2000 | Miller |
| 6,149,519 | A | 11/2000 | Osaki |
| 6,151,059 | A | 11/2000 | Schein |
| 6,151,604 | A | 11/2000 | Wlaschin |
| 6,151,702 | A | 11/2000 | Overturf |
| 6,163,345 | A | 12/2000 | Noguchi |
| 6,175,362 | B1 | 1/2001 | Harms |
| 6,175,845 | B1 | 1/2001 | Smith |
| 6,185,551 | B1 | 2/2001 | Birrell |
| 6,188,406 | B1 | 2/2001 | Fong |
| 6,189,012 | B1 | 2/2001 | Mital |
| 6,202,068 | B1 | 3/2001 | Kraay |
| 6,211,873 | B1 | 4/2001 | Moyer |
| 6,236,994 | B1 | 5/2001 | Swartz |
| 6,237,004 | B1 | 5/2001 | Dodson |
| 6,240,421 | B1 | 5/2001 | Stolarz |
| 6,243,093 | B1 | 6/2001 | Czerwinski |
| 6,243,724 | B1 | 6/2001 | Mander |
| 6,253,218 | B1 * | 6/2001 | Aoki et al. ............... 715/201 |
| 6,262,722 | B1 | 7/2001 | Allison |
| 6,266,059 | B1 | 7/2001 | Matthews |
| 6,266,098 | B1 | 7/2001 | Cove |
| 6,281,898 | B1 | 8/2001 | Nikolovska |
| 6,281,940 | B1 | 8/2001 | Sciammarella |
| 6,289,362 | B1 | 9/2001 | Van Der Meer |
| 6,295,639 | B1 | 9/2001 | Van Der Meer |
| 6,308,187 | B1 | 10/2001 | Destefano |
| 6,310,622 | B1 | 10/2001 | Asente |
| 6,313,851 | B1 | 11/2001 | Matthews |
| 6,317,761 | B1 | 11/2001 | Landsman et al. |
| 6,335,742 | B1 | 1/2002 | Takemoto |
| 6,337,698 | B1 | 1/2002 | Keely, Jr. |
| 6,338,044 | B1 | 1/2002 | Cook et al. |
| 6,344,880 | B1 | 2/2002 | Takahashi |
| 6,351,765 | B1 | 2/2002 | Pietropaolo et al. |
| 6,353,436 | B1 * | 3/2002 | Reichlen ............... G06F 3/011 345/419 |
| 6,353,831 | B1 | 3/2002 | Gustman |
| 6,366,299 | B1 | 4/2002 | Lanning |
| 6,381,362 | B1 | 4/2002 | Deshpande et al. |
| 6,388,665 | B1 | 5/2002 | Linnett |
| 6,392,651 | B1 * | 5/2002 | Stradley ............... 345/473 |
| 6,418,556 | B1 | 7/2002 | Bennington |
| 6,425,129 | B1 | 7/2002 | Sciammarella |
| 6,434,545 | B1 | 8/2002 | MacLeod et al. |
| 6,434,598 | B1 | 8/2002 | Gish |
| 6,456,938 | B1 | 9/2002 | Barnard |
| 6,457,006 | B1 | 9/2002 | Gruenwald |
| 6,457,017 | B2 | 9/2002 | Watkins |
| 6,463,431 | B1 | 10/2002 | Schmitt |
| 6,466,237 | B1 | 10/2002 | Miyao et al. |
| 6,487,557 | B1 | 11/2002 | Nagatomo et al. |
| 6,491,585 | B1 | 12/2002 | Miyamoto |
| 6,501,469 | B1 | 12/2002 | MacPhail |
| 6,507,858 | B1 | 1/2003 | Kanerva |
| 6,538,672 | B1 | 3/2003 | Dobbelaar |
| 6,542,896 | B1 | 4/2003 | Gruenwald |
| 6,553,310 | B1 | 4/2003 | Lopke |
| 6,556,225 | B1 | 4/2003 | MacPhail |
| 6,577,350 | B1 | 6/2003 | Proehl |
| 6,581,068 | B1 | 6/2003 | Bensoussan et al. |
| 6,587,106 | B1 | 7/2003 | Suzuki et al. |

(56) References Cited

U.S. PATENT DOCUMENTS

| | | |
|---|---|---|
| 6,594,673 B1 | 7/2003 | Smith |
| 6,598,043 B1 | 7/2003 | Baclawski |
| 6,600,501 B1 * | 7/2003 | Israel et al. .................. 715/810 |
| D478,090 S | 8/2003 | Nguyen |
| 6,604,144 B1 | 8/2003 | Anders |
| 6,613,100 B2 | 9/2003 | Miller |
| 6,636,246 B1 | 10/2003 | Gallo |
| 6,638,313 B1 | 10/2003 | Freeman |
| 6,642,939 B1 | 11/2003 | Vallone |
| 6,650,343 B1 | 11/2003 | Fujita |
| 6,662,357 B1 | 12/2003 | Bowman-Amuah |
| 6,668,102 B2 | 12/2003 | Chiba |
| 6,671,692 B1 | 12/2003 | Marpe et al. |
| 6,671,693 B1 | 12/2003 | Marpe |
| 6,671,694 B2 | 12/2003 | Baskins et al. |
| 6,675,158 B1 | 1/2004 | Rising |
| 6,678,671 B1 | 1/2004 | Petrovic |
| 6,678,694 B1 | 1/2004 | Zimmermann |
| 6,678,891 B1 | 1/2004 | Wilcox |
| 6,684,249 B1 | 1/2004 | Frerichs et al. |
| 6,690,391 B1 | 2/2004 | Proehl et al. |
| 6,691,127 B1 | 2/2004 | Bauer |
| 6,694,326 B2 | 2/2004 | Mayhew |
| 6,694,335 B1 | 2/2004 | Hopmann |
| 6,694,486 B2 | 2/2004 | Frank |
| 6,701,318 B2 | 3/2004 | Fox |
| 6,704,727 B1 | 3/2004 | Kravets |
| 6,704,744 B1 | 3/2004 | Williamson |
| 6,721,760 B1 | 4/2004 | Ono et al. |
| 6,725,232 B2 | 4/2004 | Bradley |
| 6,725,427 B2 | 4/2004 | Freeman |
| 6,735,591 B2 | 5/2004 | Khan |
| 6,738,787 B2 | 5/2004 | Stead |
| 6,744,447 B2 | 6/2004 | Estrada et al. |
| 6,744,967 B2 | 6/2004 | Kaminski et al. |
| 6,754,660 B1 | 6/2004 | MacPhail |
| 6,768,999 B2 | 7/2004 | Prager |
| 6,772,148 B2 | 8/2004 | Baclawski |
| 6,859,803 B2 | 2/2005 | Dagtas |
| 6,862,027 B2 | 3/2005 | Andrews |
| 6,865,717 B2 | 3/2005 | Wright et al. |
| 6,879,946 B2 | 4/2005 | Rong |
| 6,889,220 B2 | 5/2005 | Wolff |
| 6,900,807 B1 | 5/2005 | Liongosari et al. |
| 6,901,558 B1 | 5/2005 | Andreas et al. |
| 6,915,254 B1 | 7/2005 | Heinze |
| 6,915,489 B2 | 7/2005 | Gargi |
| 6,922,699 B2 | 7/2005 | Schuetze |
| 6,925,611 B2 | 8/2005 | SanGiovanni |
| 6,927,770 B2 | 8/2005 | Ording et al. |
| 6,934,916 B1 | 8/2005 | Webb et al. |
| 6,948,124 B2 | 9/2005 | Combs |
| 6,961,900 B1 | 11/2005 | Sprague et al. |
| 6,965,380 B1 | 11/2005 | Kumata et al. |
| 6,973,628 B2 | 12/2005 | Asami |
| 6,983,227 B1 | 1/2006 | Thalhammer-Reyero et al. |
| 6,985,948 B2 | 1/2006 | Taguchi et al. |
| 6,987,220 B2 | 1/2006 | Holcombe |
| 6,990,637 B2 * | 1/2006 | Anthony et al. .............. 715/851 |
| 7,007,034 B2 | 2/2006 | Hartman |
| 7,010,744 B1 | 3/2006 | Torgerson |
| 7,019,741 B2 | 3/2006 | Kelly et al. |
| 7,020,848 B2 | 3/2006 | Rosenzweig |
| 7,055,104 B1 | 5/2006 | Billmaier |
| 7,080,394 B2 | 7/2006 | Istvan |
| 7,088,859 B1 | 8/2006 | Yamaguchi |
| 7,107,531 B2 | 9/2006 | Billmaier |
| 7,107,532 B1 | 9/2006 | Billmaier |
| 7,113,975 B2 | 9/2006 | Nakayama |
| 7,117,199 B2 | 10/2006 | Frank |
| 7,137,067 B2 | 11/2006 | Yanase |
| 7,139,006 B2 | 11/2006 | Wittenburg |
| 7,149,983 B1 | 12/2006 | Robertson |
| 7,155,675 B2 | 12/2006 | Billmaier |
| 7,159,177 B2 | 1/2007 | Billmaier |
| 7,199,809 B1 | 4/2007 | Lacy |
| 7,234,114 B2 | 6/2007 | Kurtz |
| 7,266,768 B2 | 9/2007 | Ferlitsch |
| 7,289,981 B2 | 10/2007 | Chang |
| 7,290,698 B2 | 11/2007 | Poslinski et al. |
| 7,293,228 B1 | 11/2007 | Lessing et al. |
| 7,302,649 B2 | 11/2007 | Ohnishi |
| 7,318,196 B2 | 1/2008 | Crow et al. |
| 7,334,191 B1 | 2/2008 | Sivan |
| 7,336,279 B1 * | 2/2008 | Takiguchi .................. 345/473 |
| 7,346,600 B2 | 3/2008 | Nakao |
| 7,346,850 B2 | 3/2008 | Swartz |
| 7,350,157 B1 | 3/2008 | Billmaier |
| 7,353,461 B2 | 4/2008 | Davidsson |
| 7,363,591 B2 * | 4/2008 | Goldthwaite et al. ........ 715/763 |
| 7,366,994 B2 | 4/2008 | Loui |
| 7,380,260 B1 | 5/2008 | Billmaier |
| 7,418,674 B2 | 8/2008 | Robbins |
| 7,444,598 B2 | 10/2008 | Horvitz |
| 7,447,713 B1 | 11/2008 | Berkheimer |
| 7,448,950 B2 | 11/2008 | Matsumoto |
| 7,458,033 B2 | 11/2008 | Bacigalupi et al. |
| 7,502,819 B2 | 3/2009 | Alonso |
| D589,972 S | 4/2009 | Casagrande et al. |
| 7,594,246 B1 | 9/2009 | Billmaier |
| 7,606,819 B2 * | 10/2009 | Audet et al. ..................... 1/1 |
| 7,607,104 B2 | 10/2009 | Maeda |
| 7,629,527 B2 | 12/2009 | Hiner |
| 7,650,569 B1 | 1/2010 | Allen |
| 7,661,075 B2 | 2/2010 | Lahdesmaki |
| 7,680,817 B2 | 3/2010 | Audet |
| 7,681,128 B2 | 3/2010 | Yamamoto |
| 7,681,149 B2 | 3/2010 | Lahdesmaki |
| D614,197 S | 4/2010 | Casagrande |
| 7,703,040 B2 | 4/2010 | Cutrell |
| 7,710,423 B2 | 5/2010 | Drucker et al. |
| 7,714,859 B2 * | 5/2010 | Shoemaker et al. ........... 345/427 |
| 7,716,194 B2 | 5/2010 | William et al. |
| 7,716,604 B2 * | 5/2010 | Kataoka et al. ............... 715/835 |
| 7,735,102 B1 | 6/2010 | Billmaier |
| 7,739,598 B2 | 6/2010 | Porter et al. |
| 7,739,622 B2 | 6/2010 | DeLine et al. |
| 7,757,253 B2 | 7/2010 | Rappaport |
| 7,761,471 B1 | 7/2010 | Lee |
| 7,765,184 B2 | 7/2010 | Makela |
| 7,765,195 B2 | 7/2010 | Miller |
| 7,770,117 B1 | 8/2010 | Uy |
| 7,788,247 B2 | 8/2010 | Wang |
| 7,788,592 B2 | 8/2010 | William |
| 7,792,328 B2 | 9/2010 | Albertson et al. |
| 7,818,378 B2 | 10/2010 | Buchheit et al. |
| 7,822,735 B2 | 10/2010 | Suda |
| 7,844,074 B2 | 11/2010 | Moskowitz et al. |
| 7,856,424 B2 * | 12/2010 | Cisler et al. ................... 707/654 |
| 7,870,489 B2 | 1/2011 | Serita |
| 7,899,818 B2 | 3/2011 | Stonehocker |
| 7,902,741 B2 | 3/2011 | Iwanaga |
| 7,991,720 B2 | 8/2011 | Mander |
| 8,001,481 B2 | 8/2011 | Chakra et al. |
| 8,010,508 B2 | 8/2011 | Audet |
| 8,010,892 B2 | 8/2011 | Audet |
| 8,010,903 B2 | 8/2011 | Dieberger et al. |
| 8,069,404 B2 | 11/2011 | Audet |
| 8,078,966 B2 | 12/2011 | Audet |
| 8,091,033 B2 | 1/2012 | Von Sichart et al. |
| 8,099,680 B1 | 1/2012 | Kolde |
| 8,136,030 B2 | 3/2012 | Audet |
| 8,151,185 B2 * | 4/2012 | Audet .......................... 715/237 |
| 2001/0003186 A1 * | 6/2001 | DeStefano ........ G06F 17/30988 715/234 |
| 2001/0025288 A1 | 9/2001 | Yanase |
| 2001/0034766 A1 | 10/2001 | Morimoto |
| 2001/0055017 A1 | 12/2001 | Ording |
| 2002/0032696 A1 * | 3/2002 | Takiguchi et al. ......... 707/500.1 |
| 2002/0033848 A1 | 3/2002 | Sclammarello |
| 2002/0035563 A1 | 3/2002 | Suda |
| 2002/0056129 A1 | 5/2002 | Blackketter |
| 2002/0059215 A1 | 5/2002 | Kotani et al. |
| 2002/0070958 A1 | 6/2002 | Yeo |

(56) References Cited

U.S. PATENT DOCUMENTS

| | | | |
|---|---|---|---|
| 2002/0078440 A1 | 6/2002 | Feinberg | |
| 2002/0087530 A1 | 7/2002 | Smith | |
| 2002/0091739 A1* | 7/2002 | Ferlitsch | G06F 17/24 715/273 |
| 2002/0096831 A1 | 7/2002 | Nakayama | |
| 2002/0101458 A1 | 8/2002 | SanGiovanni | |
| 2002/0105541 A1* | 8/2002 | Endou et al. | 345/738 |
| 2002/0140740 A1* | 10/2002 | Chen | 345/810 |
| 2002/0152474 A1 | 10/2002 | Dudkiewicz | |
| 2002/0180795 A1 | 12/2002 | Wright et al. | |
| 2003/0001898 A1 | 1/2003 | Bernhardson | |
| 2003/0001901 A1 | 1/2003 | Crinon et al. | |
| 2003/0037051 A1 | 2/2003 | Gruenwald | |
| 2003/0046693 A1 | 3/2003 | Billmaier | |
| 2003/0046694 A1 | 3/2003 | Istvan | |
| 2003/0046695 A1 | 3/2003 | Billmaier | |
| 2003/0052900 A1 | 3/2003 | Card | |
| 2003/0090524 A1 | 5/2003 | Segerberg | |
| 2003/0093260 A1 | 5/2003 | Dagtas | |
| 2003/0093792 A1 | 5/2003 | Labeeb | |
| 2003/0095149 A1* | 5/2003 | Fredriksson | G06F 3/0481 715/797 |
| 2003/0120681 A1 | 6/2003 | Baclawski | |
| 2003/0120737 A1 | 6/2003 | Lytle | |
| 2003/0121055 A1 | 6/2003 | Kaminski et al. | |
| 2003/0128228 A1 | 7/2003 | Crow et al. | |
| 2003/0132971 A1 | 7/2003 | Billmaier | |
| 2003/0142136 A1* | 7/2003 | Carter et al. | 345/782 |
| 2003/0149939 A1 | 8/2003 | Hubel | |
| 2003/0163468 A1 | 8/2003 | Freeman | |
| 2003/0167902 A1 | 9/2003 | Hiner | |
| 2003/0190950 A1 | 10/2003 | Matsumoto | |
| 2003/0237047 A1 | 12/2003 | Borson | |
| 2004/0003398 A1 | 1/2004 | Donian et al. | |
| 2004/0024738 A1 | 2/2004 | Yamane | |
| 2004/0054968 A1 | 3/2004 | Savage | |
| 2004/0064473 A1 | 4/2004 | Thomas | |
| 2004/0090439 A1 | 5/2004 | Dillner | |
| 2004/0111401 A1 | 6/2004 | Chang | |
| 2004/0125143 A1 | 7/2004 | Deaton | |
| 2004/0128277 A1 | 7/2004 | Mander | |
| 2004/0128377 A1 | 7/2004 | Sadaghiany | |
| 2004/0139143 A1 | 7/2004 | Canakapalli | |
| 2004/0150657 A1 | 8/2004 | Wittenburg | |
| 2004/0233238 A1 | 11/2004 | Lahdesmaki | |
| 2004/0233239 A1 | 11/2004 | Lahdesmaki | |
| 2004/0263519 A1 | 12/2004 | Andrews | |
| 2005/0060667 A1 | 3/2005 | Robbins | |
| 2005/0119936 A1 | 6/2005 | Buchanan et al. | |
| 2005/0210410 A1* | 9/2005 | Ohwa | G06F 3/0482 715/821 |
| 2005/0262533 A1* | 11/2005 | Hart et al. | 725/40 |
| 2006/0013554 A1 | 1/2006 | Poslinski et al. | |
| 2006/0013555 A1 | 1/2006 | Poslinski et al. | |
| 2006/0013556 A1 | 1/2006 | Poslinski et al. | |
| 2006/0013557 A1 | 1/2006 | Poslinski et al. | |
| 2006/0020966 A1 | 1/2006 | Poslinski et al. | |
| 2006/0020971 A1 | 1/2006 | Poslinski et al. | |
| 2006/0041521 A1* | 2/2006 | Oral | G06F 17/30696 |
| 2006/0045470 A1 | 3/2006 | Poslinski et al. | |
| 2006/0136466 A1 | 6/2006 | Weiner | |
| 2006/0197782 A1* | 9/2006 | Sellers et al. | 345/660 |
| 2006/0209069 A1 | 9/2006 | Bacigalupi et al. | |
| 2006/0236251 A1* | 10/2006 | Kataoka | G06F 3/0481 715/757 |
| 2006/0242178 A1 | 10/2006 | Butterfield | |
| 2006/0248129 A1 | 11/2006 | Carnes | |
| 2006/0259511 A1 | 11/2006 | Boerries | |
| 2007/0005576 A1 | 1/2007 | Cutrell | |
| 2007/0007884 A1 | 1/2007 | Iwanaga | |
| 2007/0061855 A1 | 3/2007 | Serita | |
| 2007/0067290 A1 | 3/2007 | Makela | |
| 2007/0083527 A1 | 4/2007 | Wadler et al. | |
| 2007/0136687 A1* | 6/2007 | Pak | G06F 3/04897 715/811 |
| 2007/0143803 A1 | 6/2007 | Lim et al. | |
| 2007/0156654 A1 | 7/2007 | Ravinarayanan | |
| 2007/0168877 A1 | 7/2007 | Jain et al. | |
| 2007/0171224 A1* | 7/2007 | MacPherson | 345/440 |
| 2007/0185826 A1* | 8/2007 | Brice et al. | 707/1 |
| 2007/0204218 A1 | 8/2007 | Weber | |
| 2007/0214169 A1* | 9/2007 | Audet | G06F 17/2205 |
| 2007/0216694 A1 | 9/2007 | Audet | |
| 2007/0220209 A1 | 9/2007 | Maeda et al. | |
| 2007/0239676 A1 | 10/2007 | Stonehocker | |
| 2007/0271508 A1* | 11/2007 | Audet | 715/530 |
| 2008/0000126 A1 | 1/2008 | Teza | |
| 2008/0016142 A1 | 1/2008 | Schneider | |
| 2008/0019371 A1 | 1/2008 | Anschutz | |
| 2008/0022199 A1 | 1/2008 | Sako | |
| 2008/0058106 A1 | 3/2008 | Audet | |
| 2008/0071822 A1 | 3/2008 | Audet | |
| 2008/0072169 A1 | 3/2008 | Audet | |
| 2008/0092038 A1 | 4/2008 | Audet | |
| 2008/0098323 A1 | 4/2008 | Vallone et al. | |
| 2008/0104534 A1 | 5/2008 | Park et al. | |
| 2008/0118219 A1 | 5/2008 | Chang et al. | |
| 2008/0133579 A1 | 6/2008 | Lim | |
| 2008/0134013 A1* | 6/2008 | Audet | 715/201 |
| 2008/0134022 A1 | 6/2008 | Audet | |
| 2008/0141115 A1 | 6/2008 | Audet | |
| 2008/0186305 A1* | 8/2008 | Carter | 345/419 |
| 2008/0243778 A1 | 10/2008 | Behnen | |
| 2008/0244437 A1 | 10/2008 | Fischer et al. | |
| 2008/0256473 A1 | 10/2008 | Chakra et al. | |
| 2008/0256474 A1 | 10/2008 | Chakra et al. | |
| 2008/0270361 A1 | 10/2008 | Meyer | |
| 2008/0270928 A1 | 10/2008 | Chakra et al. | |
| 2008/0295016 A1* | 11/2008 | Audet | 715/772 |
| 2008/0299989 A1 | 12/2008 | King | |
| 2008/0307348 A1 | 12/2008 | Jones et al. | |
| 2009/0019371 A1 | 1/2009 | Audet | |
| 2009/0040532 A1* | 2/2009 | Kawasaki et al. | 356/610 |
| 2009/0048981 A1 | 2/2009 | Millan | |
| 2009/0055413 A1 | 2/2009 | Audet | |
| 2009/0055726 A1 | 2/2009 | Audet | |
| 2009/0055729 A1 | 2/2009 | Audet | |
| 2009/0055763 A1 | 2/2009 | Audet | |
| 2009/0055776 A1 | 2/2009 | Audet | |
| 2009/0063552 A1 | 3/2009 | Jones | |
| 2009/0064143 A1 | 3/2009 | Bhogal et al. | |
| 2009/0070662 A1 | 3/2009 | Audet | |
| 2009/0070699 A1 | 3/2009 | Birkill et al. | |
| 2009/0083260 A1 | 3/2009 | Artom | |
| 2009/0083859 A1 | 3/2009 | Roth et al. | |
| 2009/0106684 A1 | 4/2009 | Chakra et al. | |
| 2009/0106685 A1 | 4/2009 | Care et al. | |
| 2009/0113334 A1 | 4/2009 | Chakra et al. | |
| 2009/0116817 A1 | 5/2009 | Kim et al. | |
| 2009/0150832 A1 | 6/2009 | Keller et al. | |
| 2009/0164933 A1 | 6/2009 | Pederson et al. | |
| 2009/0199119 A1 | 8/2009 | Park et al. | |
| 2009/0228788 A1 | 9/2009 | Audet | |
| 2009/0235194 A1 | 9/2009 | Arndt et al. | |
| 2009/0254850 A1 | 10/2009 | Almeida | |
| 2009/0284658 A1 | 11/2009 | Cho | |
| 2009/0287693 A1 | 11/2009 | Audet | |
| 2009/0288006 A1 | 11/2009 | Audet | |
| 2009/0319933 A1 | 12/2009 | Zaika et al. | |
| 2010/0057576 A1 | 3/2010 | Brodersen et al. | |
| 2010/0077355 A1* | 3/2010 | Belinsky | G06F 3/0482 715/835 |
| 2010/0082427 A1 | 4/2010 | Burgener | |
| 2010/0082653 A1 | 4/2010 | Nair | |
| 2010/0083159 A1 | 4/2010 | Mountain et al. | |
| 2010/0094890 A1 | 4/2010 | Bokor | |
| 2010/0145976 A1 | 6/2010 | Higgins | |
| 2010/0150522 A1 | 6/2010 | Schmehl et al. | |
| 2010/0169823 A1 | 7/2010 | Audet | |
| 2010/0171861 A1 | 7/2010 | Ota et al. | |
| 2010/0185509 A1 | 7/2010 | Higgins | |
| 2010/0313158 A1 | 12/2010 | Lee et al. | |
| 2010/0313159 A1 | 12/2010 | Decker et al. | |
| 2010/0318200 A1 | 12/2010 | Foslien et al. | |

(56) References Cited

U.S. PATENT DOCUMENTS

| | | |
|---|---|---|
| 2010/0325132 A1 | 12/2010 | Liu |
| 2010/0325134 A1 | 12/2010 | Galfond |
| 2010/0332512 A1 | 12/2010 | Shpits |
| 2010/0333031 A1 | 12/2010 | Castelli |
| 2011/0010667 A1* | 1/2011 | Sakai et al. ............... 715/810 |
| 2011/0061082 A1 | 3/2011 | Heo et al. |
| 2011/0078166 A1 | 3/2011 | Oliver |
| 2011/0145745 A1 | 6/2011 | Hyeon et al. |
| 2011/0154213 A1 | 6/2011 | Wheatley et al. |
| 2011/0246926 A1 | 10/2011 | Newton |
| 2011/0307814 A1 | 12/2011 | Audet |
| 2012/0159320 A1 | 6/2012 | Audet |
| 2012/0183273 A1* | 7/2012 | Utsuki et al. ............... 386/230 |
| 2012/0198385 A1 | 8/2012 | Audet |
| 2012/0198389 A1 | 8/2012 | Audet |
| 2012/0249581 A1 | 10/2012 | Cassistat |
| 2012/0260204 A1 | 10/2012 | Audet |
| 2013/0080880 A1 | 3/2013 | Cassistat |
| 2013/0080888 A1 | 3/2013 | Audet |

FOREIGN PATENT DOCUMENTS

| | | |
|---|---|---|
| JP | 08-016612 | 1/1996 |
| JP | 09-016809 | 1/1997 |
| JP | 09-265480 | 10/1997 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO 00/65429 | 11/2000 |
| WO | WO 01/22194 | 3/2001 |
| WO | WO 01/63378 | 8/2001 |
| WO | WO 01/98881 | 12/2001 |
| WO | WO 03/001345 | 1/2003 |
| WO | WO 03/032199 | 4/2003 |
| WO | WO 2005/045756 | 5/2005 |
| WO | WO 2005/083595 | 9/2005 |
| WO | WO 2007/095997 | 8/2007 |
| WO | WO 2008/030779 | 3/2008 |

OTHER PUBLICATIONS

Haystack Project; David R. Karger, Stephen J. Garland, Karun Bakshi, David Huynh, Nicholas Matsakis, Dennis Quan, Vineet Sinha, Jaime Teevan, Yuan Shen, Punyashloka Biswal, Artem Gleyzer, Ryan Manuel, Alexandre P. Poliakov, Amanda Smith, Lynn A. Stein, Eytan Adar, Mark Asdoorian, Robert Aspell, Wendy Chien, Gabriel Cunningham, Jonathan Derryberry, Adam Holt, Joshua Kramer, Percy Liang, Ilya Lisansky, Aidan Low, Enrique A. Muñoz Torres, Mark Rosen, Kai Shih, Svetlana Shnitser, Ben Walter, Marina Zhurakhinskaya; Massachsetts Institute of Technology; http://web.archive.org/web/20070415053620/http://haystack.lcs.mit.edu/; http://groups.csail.mit.edu/haystack/ ; http://en.wikipedia.org/wiki/Haystack_%28MIT_project%29.

* cited by examiner

METHOD OF MANAGING ARRAYS OF DOCUMENTS

CROSS-REFERENCES

The present invention relates to, is a continuation of and claims priority from U.S. patent application Ser. No. 12/168,118, filed May 7, 2008, entitled ARRAY OF DOCUMENTS MANAGEMENT, which claims priority from U.S. Provisional patent application No. 60/957,444, filed Aug. 22, 2007, entitled INFORMATION ELEMENTS LOCATING SYSTEM AND METHOD; U.S. Provisional patent application No. 60/971,214, filed Sep. 10, 2007, entitled GEOGRAPHICAL LOCATING SYSTEM AND METHOD; and from U.S. Provisional patent application No. 61/034,625, filed Mar. 7, 2008, entitled INTERFACE. All the previously cited documents are incorporated herein by reference in their entireties.

The present application also incorporates by reference each of: U.S. Pat. No. 7,606,819; U.S. Pat. No. 8,010,508; and U.S. patent application Ser. No. 11/885,120 and corresponding publication US 2008/0130563 A1; U.S. patent application Ser. No. 11/944,014 and corresponding publication US 2009/0055413 A1; and U.S. patent application Ser. No. 11/774,591 and corresponding publication US 2007/0271508 A1.

BACKGROUND OF THE INVENTION

1. Field of the Invention

This invention relates generally to computer systems and more specifically to a method, a system and an information organizing system that facilitates localization and organization of documents along axes thereof. More precisely, the present invention relates to the management of the display of a plurality of axes of documents.

2. Description of the Related Art

United States Patent Application Publication No.: US 2007/0214169 A1, published on Sep. 13, 2007 discloses a Multi-dimensional locating system and method (title). The patent application discloses ways for managing and displaying vectors of documents and other computer-readable files. A vector of documents that groups a plurality of documents along a predetermined order, inter alia, is taught.

United States Patent Application Publication No.: US 2007/0271508 A1, published on Nov. 22, 2007 discloses a Multi-dimensional locating system and method (title). A plurality of vectors of documents and other computer-readable files sharing a common timeline is disclosed.

With the possibility of displaying a plurality of vectors of documents and other computer-readable files it might be desirable to manage the number of visible vectors of documents and other computer-readable files to avoid confusion.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

This invention generally refers to user-selectable elements that include computer-readable files, like documents, and multimedia assets. User-selectable elements can alternatively be referred to simple icons or thumbnails that are associated to a category, a tag or a menu and arranged as explained below. In order to lighten the reading of the text, the term array of documents is generally used.

The present invention relates to a method, a computer-readable medium adapted to include computer-executable code providing a method, a system adapted to produce the method and a graphical user interface. The applicant reserves the right to file additional claims directed to the above listed claim types.

Therefore, an aspect of the present invention provides a limited number of visible arrays of documents, or files, to avoid overloading a display with too many arrays of documents simultaneously visible on the display.

Another aspect of the present invention provides a limited number of displayable arrays of documents; arrays of documents over the limited number of displayable arrays of documents are rendered invisible.

One other aspect of the present invention provides that, upon display of additional arrays of documents over a predetermined number of visible arrays of documents, the first arrays of documents that will be rendered invisible are the formermost displayed arrays of documents.

One aspect of the present invention provides progressive invisibility enablement to the arrays of documents to be rendered invisible so that one can appreciate which arrays of documents are disappearing.

An aspect of the present invention provides that the displayed array of documents that are over the allowed number of displayable array of documents that will be rendered invisible will become invisible after the new array of documents is displayed.

Another one aspect of the present invention provides a limited number of logical intersections created by the intersection of a plurality of arrays of documents; the limited number of displayable logical intersections will influence the number of arrays of documents that are displayed.

Another aspect of the present invention provides a limited number of logical intersections between arrays of documents. The arrays of documents material in the enablement of the logical intersections exceeding the limited number visible of logical intersection are rendered invisible.

One other aspect of the present invention provides navigational capability among arrays of documents and displaying newer arrays of documents when needed and, conversely, rendering invisible older arrays of documents to maintain a comprehensive number of visible arrays of documents.

An aspect of the present invention provides navigational capability among arrays of documents displaying, in sequence, new arrays of documents and rendering invisible, preferably in sequence, old arrays of documents to maintain a comprehensive number of visible arrays of documents, the navigation capability also provides to go back in the sequence and displays again the most recent arrays of documents that has been rendered invisible and renders invisible the latter newly displayed array of documents such that the comprehensive number of visible arrays of documents is maintained while a user navigates along the sequence of arrays of documents.

Another aspect of the present invention provides a discriminating visual feature from which a viewer can infer the order of appearance/creation of arrays of documents that is a perspective among arrays of documents to display, with a closer appearance, the most recent arrays of documents and to display, progressively further, the less recent arrays of documents.

An aspect of the present invention provides a third dimension orthogonal to a 2-dimensional display, representing time; the superposition of arrays of documents on the display being made in accordance with the orthogonal time line thus helping a viewer to infer which array is more recent than another array.

One other aspect of the present invention provides a shadow in the neighborhood of the intersection of two arrays of documents to increase the contrast between the two arrays and emphases one of the arrays of documents.

One aspect of the present invention provides a watermark of the position on the display of the invisible arrays of documents illustrating the location of the invisible array of documents, the watermark being preferably different for parent arrays of documents and for children arrays of documents.

An aspect of the present invention provides a name to an array of documents, the name being displayable on the array of documents An aspect of the present invention provides an identification of a logical intersection between two arrays of documents such that a user discriminates the logical intersection from other trivial intersections.

An additional aspect of the present invention provides a discriminating visual feature discriminating arrays of documents according to their sequence of enablement.

Another additional aspect of the present invention provides a discriminating visual feature discriminating arrays of documents according to their sequence of display.

One other aspect of the invention provides an intersection between two arrays of documents that can be alternatively locked and unlocked such that the two arrays of documents move together in the locked condition and move independently from one another in the unlocked condition.

One aspect of the present invention provides a visual indicator to logical intersections between arrays of documents to discriminate the logical intersections from other intersections.

An aspect of the present invention provides a visual indicator of the side where each portion of an unlocked logical intersection is located in respect to each other.

One other aspect of the invention provides a function allowing reconnection of an unlocked logical intersection; the reconnection is preferably progressive and animated to allow a viewer to notice the change in the arrays' positions; preferably the selected array is not moving such that the user keeps the focus on the subject array.

Another aspect of the invention provides functions allowing a user to manage an array of document; the function is preferably actuated through a menu providing, inter alia, the user with options to put a name to the array, to decide to see the name of the array on the array, to decide to see the query at the base of the array on the array, to change the background color of the array, to hide parents or children arrays, to see the number of documents on the array and to see the border dates between which the documents are disposed when the documents are disposed along a timeline.

One additional aspect of the present invention provides a user-selectable dialog to the user in relation with a document on an array of document; the dialog presenting editable information, metadata, thumbnail and selectable attributes when the document does not display that information.

One additional aspect of the present invention provides a user-selectable dialog to the user in relation with an array of document.

Another aspect of the present invention provides a machine-readable medium comprising machine-readable instructions providing a method for discriminating arrays of user-selectable elements, the method comprising: displaying a first array of user-selectable elements, the first array of user-selectable elements being adapted to group user-selectable elements; displaying a second array of user-selectable elements, the second array of user-selectable elements being adapted to group user-selectable elements; enabling a discriminating visual feature to at least one of the first array of user-selectable elements and the second array of user-selectable elements, the discriminating visual feature being adapted to indicate a position of the array of user-selectable elements in a sequence about which the arrays of user-selectable elements have been displayed.

One aspect of the present invention provides a machine-readable medium comprising machine-readable instructions providing a method adapted to connect longitudinal alignment of user-selectable elements, the method comprising: displaying a first longitudinal alignment of user-selectable elements; displaying a second longitudinal alignment of user-selectable elements intersecting the first longitudinal alignment of user-selectable elements at an intersection; selecting one of a locked intersection state and an unlocked intersection state, wherein the second longitudinal alignment of user-selectable elements is not moveable in respect with the first longitudinal alignment of user-selectable elements when the intersection is the locked state and wherein the second longitudinal alignment of user-selectable elements is moveable in respect with the first longitudinal alignment of user-selectable elements when the intersection is in the unlocked state.

One other aspect of the present invention provides a machine-readable medium comprising machine-readable instructions providing a method for displaying information related to a document, the method comprising: displaying an array of documents grouping a group of documents; receiving instructions regarding a desired portion of the display; if a document is displayed at the desired portion of the display, displaying a dialog related to the document; if an array of documents is displayed at the desired portion of the display, displaying a dialog related to the array; and selecting an information from the displayed dialog.

One other aspect of the present invention provides a shadow in the neighborhood of the intersection of two arrays of documents to increase the contrast between the two vectors and emphasis one of the arrays of documents.

These and other advantages and features of the present invention will become apparent from the following description and the attached drawings.

DESCRIPTION OF EMBODIMENT(S) OF THE INVENTION

Figure 1:
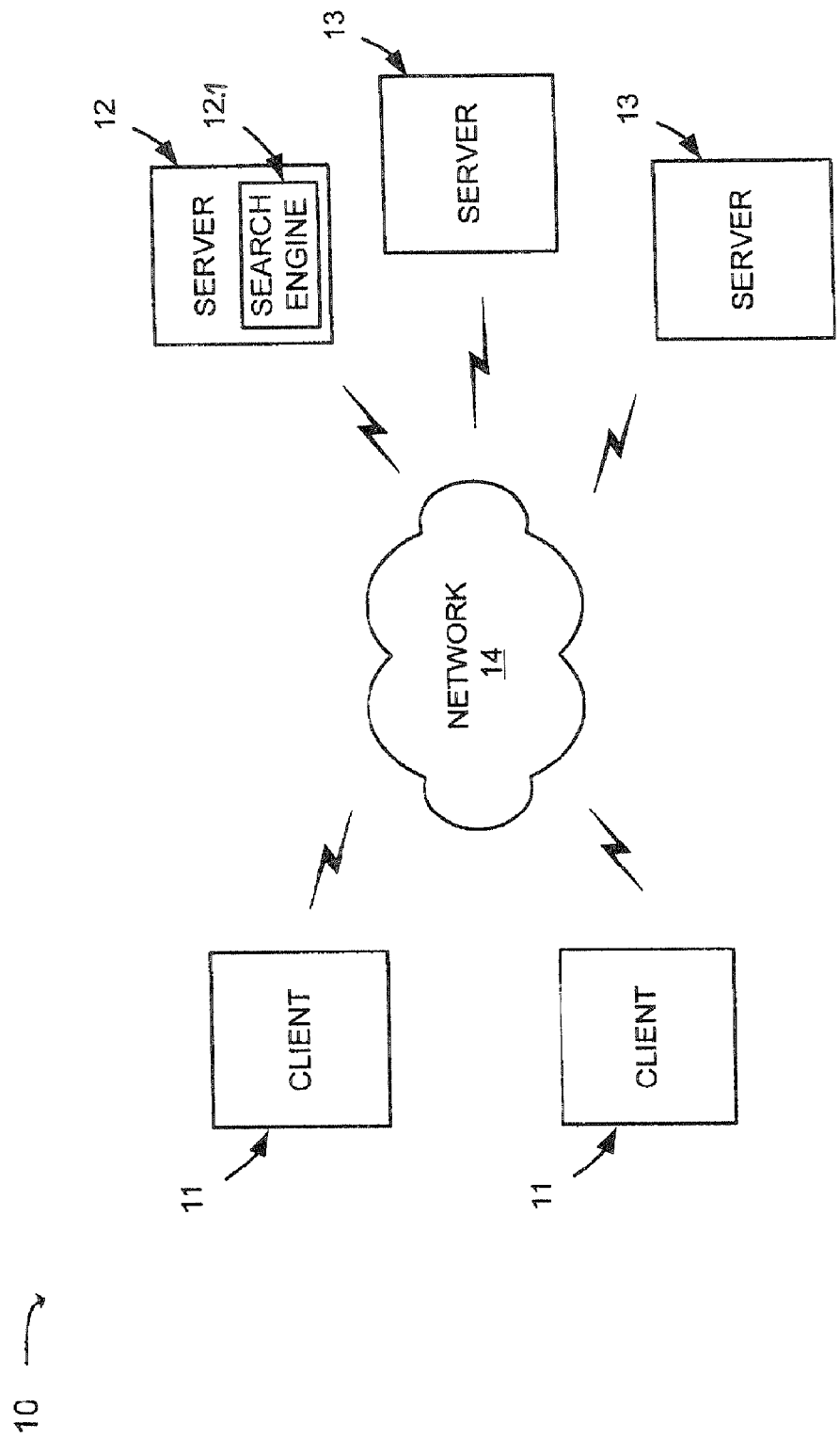
FIG. 1 is a schematic view of a computer network.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The features provided in this specification mainly relates to computer software and machine-readable code/instructions. These code/instructions are preferably stored on a machine-readable medium to be read and acted upon to with a computer or a machine having the appropriate code/instructions reading capability.

Exemplary Network

FIG. 1 illustrates an exemplary network 10 in which a system and method, consistent with the present invention, may be implemented. The network 10 may include multiple client devices 11 connected to multiple servers 12, 13 via a network 14. The network 14 may include a local area network (LAN), a wide area network (WAN), a telephone network, such as the Public Switched Telephone Network (PSTN), an intranet, the Internet, Wi-Fi, WiMAX or a combination of networks. Two client devices 11 and three servers 12, 13 have been illustrated as connected to network 14 for simplicity. In practice, there may be more or less client devices and servers. Also, in some instances, a client device may perform the functions of a server and a server may perform the functions of a client device.

The client devices 11 may include devices, such as mainframes, minicomputers, personal computers, laptops, personal digital assistants, telephones, or the like, capable of connecting to the network 14. The client devices 11 may transmit data over the network 14 or receive data from the network 14 via a wired, wireless, or optical connection.

The servers 12, 13 may include one or more types of computer systems, such as a mainframe, minicomputer, or personal computer, capable of connecting to the network 14 to enable servers 12, 13 to communicate with the client devices 11. In alternative implementations, the servers 12, 13 may include mechanisms for directly connecting to one or more client devices 11. The servers 12, 13 may transmit data over network 14 or receive data from the network 14 via a wired, wireless, or optical connection.

In an implementation consistent with the present invention, the server 12 may include a search engine 12.1 usable by the client devices 11. The servers 13 may store documents, such as web pages, accessible by the client devices 11.

Exemplary Client Architecture

Figure 2:
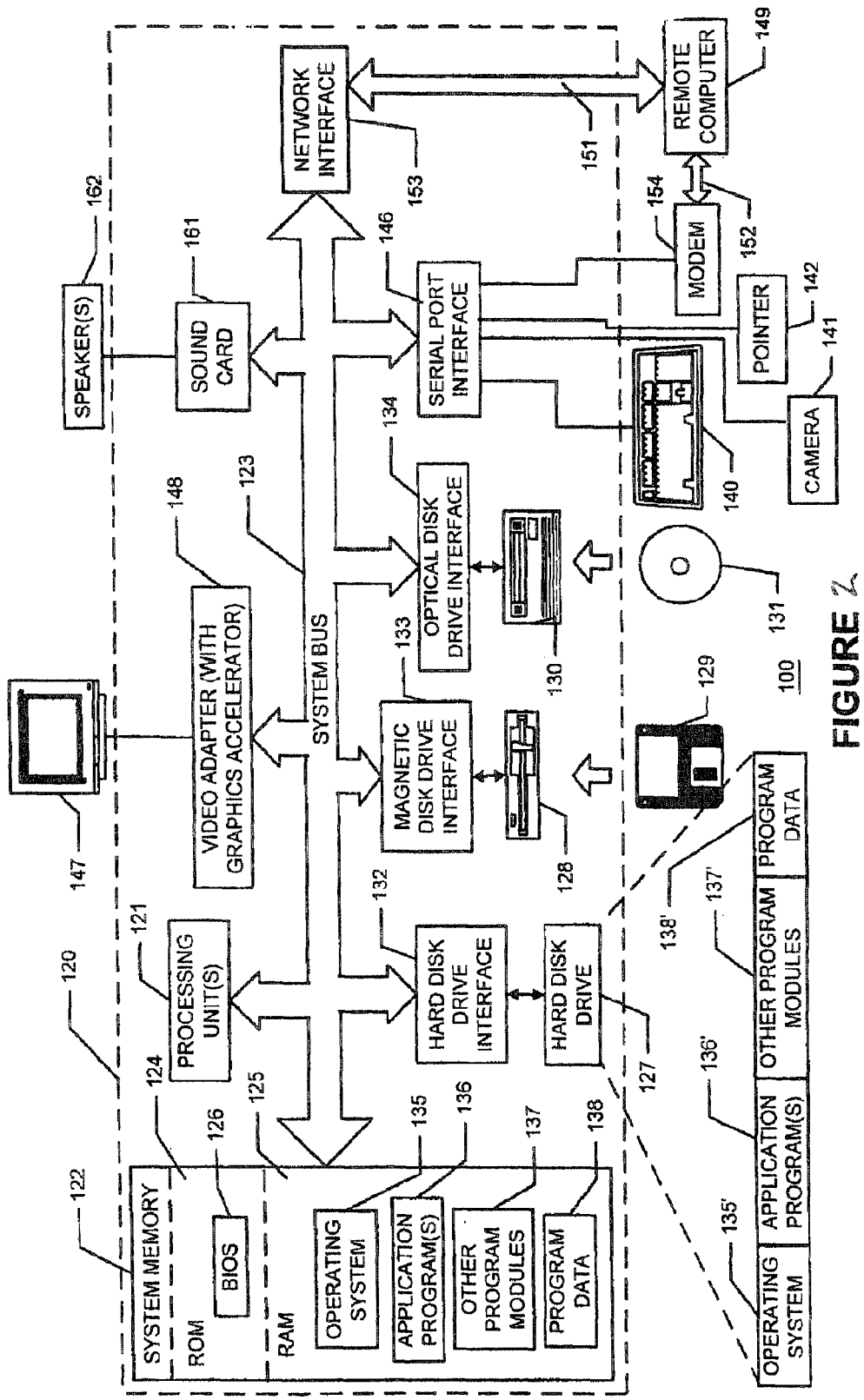
FIG. 2 is a schematic view of a computer system.

FIG. 2 and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, gaming console and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 2, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide nonvolatile (or persistent) storage of machine readable instructions, data structures, program modules and other data for the personal computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash.), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and information into the personal computer 120 through input devices, such as a keyboard 140, a camera 141 and pointing device 142 for example. Other input devices (not shown) such as a microphone, joystick, game pad, satellite dish, scanner, a touch sensitive screen, accelerometers adapted to sense movements of the user or movements of a device, or the like may also be included. These and other input devices are often connected to the processing unit 121 through a serial port interface 146 coupled to the system bus. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the personal computer 120 may include other peripheral output devices (not shown), such as a printer for example. As an alternative or an addition to the video monitor 147, a stereo video output device, such as a head mounted display or LCD shutter glasses for example, could be used.

The personal computer 120 may operate in a networked environment which defines logical connections to one or more remote computers, such as a remote computer 149. The remote computer 149 may be another personal computer, a server, a router, a network PC, a peer device or other common network node, and may include many or all of the elements described above relative to the personal computer 120, although only a memory storage device has been illustrated in FIG. 1. The logical connections depicted in FIG. 2 include a local area network (LAN) 14 and a wide area network (WAN) 152, an intranet and the Internet.

When used in a LAN, the personal computer 120 may be connected to the LAN 14 through a network interface adapter (or "NIC") 153. When used in a WAN, such as the Internet, the personal computer 120 may include a modem 154 or other means for establishing communications over the wide area network 152 (e.g. Wi-Fi, WinMax). The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

The Interface

An interface program providing an interface for managing documents is installed on a computer system. The interface might run through the operating system and the hardware of the computer system or through a network based system. The interface is adapted to manage documents, computer files, multimedia content, applications and user-selectable menu elements in a comprehensive fashion. We will refer to the term "documents" in this patent application to ease the reading but no right is declined in respect to the computer files, multimedia content, applications and user-selectable menu elements. The documents are stored on a machine-readable medium and can be retrieved when needed by the interface program. The documents are disposed in an array structure providing a visually comprehensive display layout of the documents. The array can illustratively be based on a chronological order, a statistical order, an order representing an increasing file size or simply according to an attribute e.g. owner of the file. The array thus helps the viewer to infer some additional meaning from the distribution of the documents. An array is adapted to accommodate more than one type of documents or a mix of documents, computer files, multimedia content and user-selectable menu elements.

One type of array of embodiments illustrated in FIG. 4 through FIG. 11 has a substantially rectilinear shape characterized by a straight line, in other words, the array, axis and/or a vector is adapted to locate each document to be displayed on a line or on a curved line. Another illustrative type of array is a group of juxtaposed linear distribution of documents grouped together to form a matrix of documents. Only a portion of the array can be visible and a play of zoom, pan and navigation along the array allows a viewer to change the documents that are displayed on the display. One of the goals of using an array of documents is to meaningfully and intuitively display the documents in accordance with a predetermined order.

Each array groups documents in accordance with, for example, a tag, a category or an attribute that is commonly shared among the documents of the array of documents. The selection of one or more attribute determined the documents to be part of the array of documents. If no specific attribute is selected then the array of documents displays all documents. A linear distribution of documents can sort documents on a timeline. That is all documents on the same array of documents are associated with the selected set of attributes in addition to meaningfully be distributed on a timeline as a suite of documents. In the case of a matrix of documents, then, one axis of the matrix can represent a timeline while the other axis represents another criterion like, for example, the type of computer files each document relates to.

The attributes of a document can be selected to create another array of documents. The attribute of a document from the newly created array of documents can be selected to create an additional array of documents and so on so forth. The user can "navigate" along the arrays of documents in accordance with their metadata or categorization to visualize the documents. Navigation tools are provided with the interface to allow navigation through various arrays of documents and through the documents of a single array of documents.

Arrays Discrimination

An interface displaying a plurality of arrays and/or axes of documents can become overloaded if too many arrays of documents are found therein. The term arrays will be used throughout the present specification to improve the readability of the text while one skilled in the art would understand that it encompasses the term "axes". One way to prevent displaying too many arrays of documents is to limit the number of arrays that are displayable.

In the context of creating arrays more than one arrays of documents it is likely that the interface can display a plurality of array purposefully and without creating a confusing arrangement for a user. For example, a first array of documents is displayed grouping documents about cars (all documents are associated with the category "car"), a second array of documents is displayed grouping documents about phones and a third array of documents is displayed grouping documents about books. The three arrays of documents have been displayed one after the other thus defining a sequence, the first array, the second array and then the third array.

If a maximum number of simultaneously displayable arrays and/or axes of documents is set to three arrays and/or axes of documents then the next array and/or axes of documents created will go over the maximum number of array and/or axes that is allowed.

A fourth array of documents is displayed grouping, for example, pictures. At this point the first array of documents, the first one displayed in the sequence, will become invisible so that only three, the maximum number of displayed arrays allowed, will remain visible.

Figure 3:
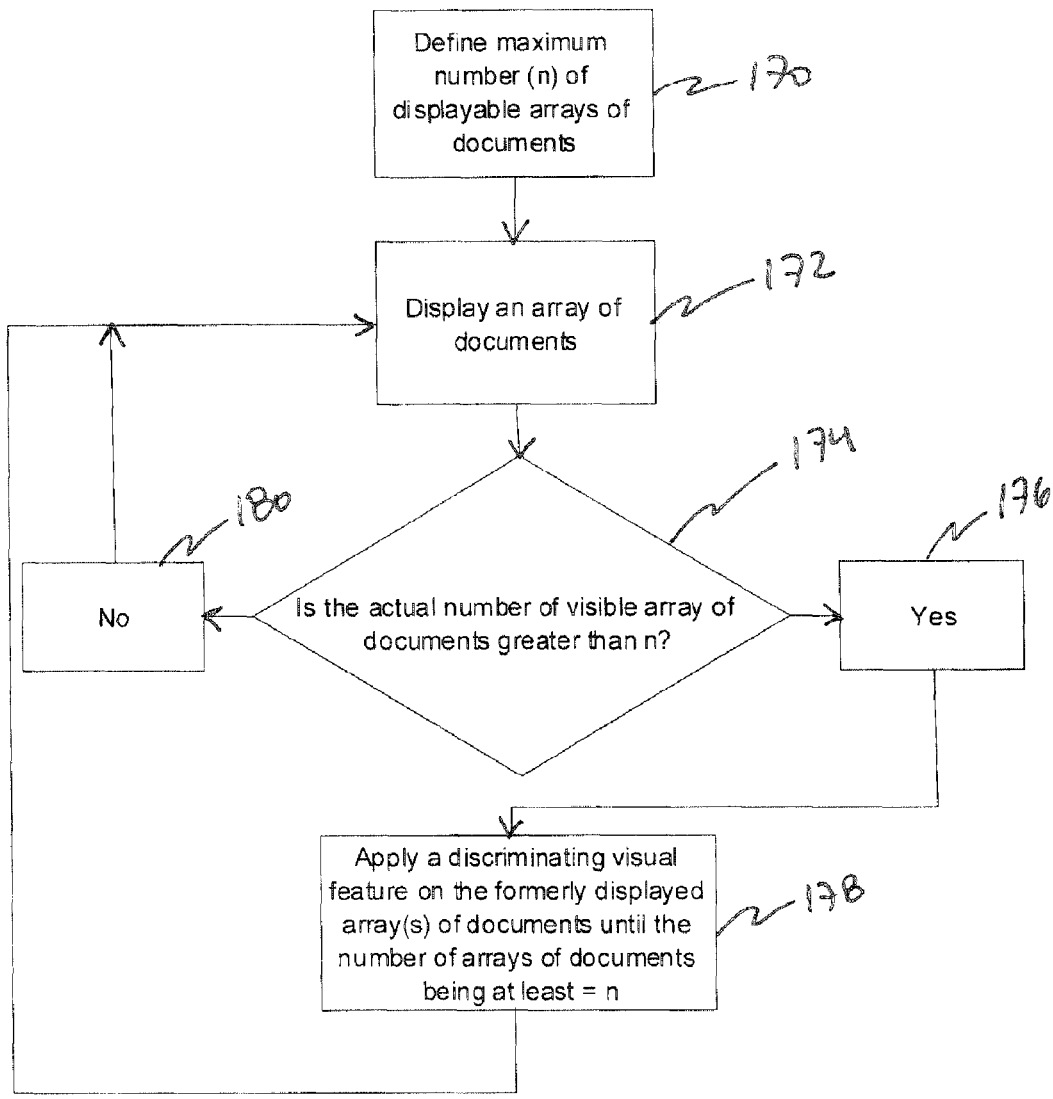
FIG. 3 is a flow chart of illustrating an embodiment how to apply a discriminating feature to an array of documents in accordance with an embodiment of the present invention.

Referring now to FIG. 3. The computer system 120 will receive instruction to set a maximum number of arrays of documents 170. Then, one or many arrays of documents will be displayed 172 and at each time the system will inquire 174 if the maximum number of arrays of documents 170 is reached. If the number of displayed arrays is exceeded 176 a discriminating visual feature will be applied 178 to one or many arrays of documents in accordance to the maximum number of displayable arrays 170. In contrast, if the maximum number of displayable arrays is not reached 180 other arrays of documents could be displayed 172 until the maximum number of visible arrays of documents 170 is reached 176 and a discriminating visual feature is applied 178.

The discriminating visual feature is helping a user to infer the display sequence of the arrays of documents. This can be done in different ways. Firstly, the arrays of documents over the maximum number of displayable arrays 170 can become invisible. Secondly, a graphical distinction can be applied to the arrays in accordance with their order of display in the sequence of arrays display.

In the former situation, the older displayed array simply becomes invisible to leave displayed only the most recent arrays of documents up to the maximum number of displayable arrays of documents. The invisibility can be made instantaneously when an additional array is displayed or become invisible slowly after the new array is displayed. The latter option is advantageously because a user could see which one is new and which one(s) is becoming invisible.

An optional feature could be to leave a trace of the invisible arrays without clustering the display just to allow the viewer to see where were disposed on the display the arrays that were rendered invisible to lighten the interface. This trace could be a "watermark" or a shadow made of a color that is slightly different from the color used for the rear of the interface of the invisible arrays.

Figure 11:
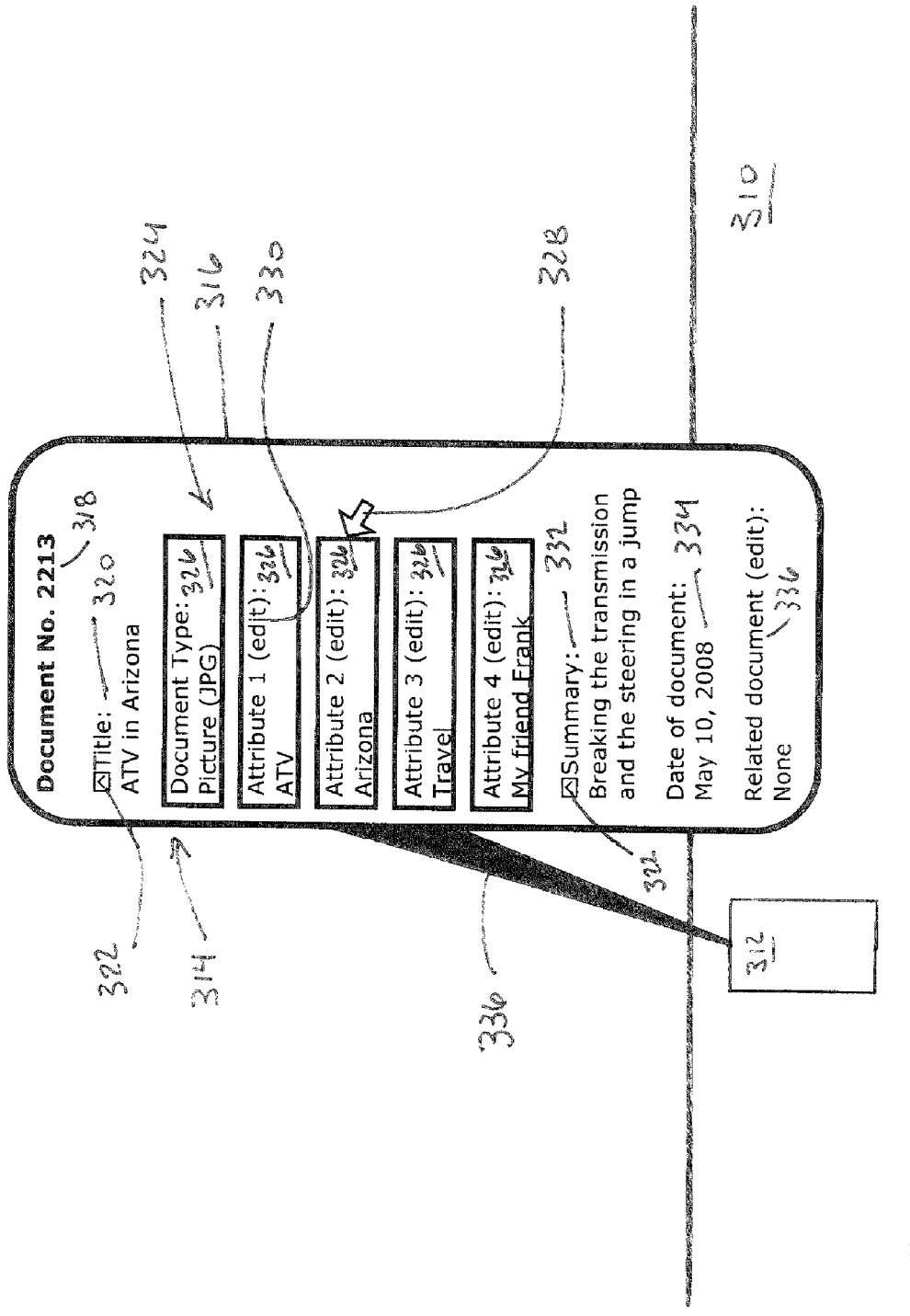
FIG. 11 is a schematic view of an interactive document dialog.

The second option can be explained in light of FIG. 11. Four arrays of documents 190, 192, 194, 196 are displayed. Each displaying a group of documents 198. The sequence of display was in the same order, e.g. array 190, array 192, array 194 and, at last, array 196. The discriminating feature here provides a clear graphical distinction when looking at the arrays 190, 192, 194, and 196. The darker is the border 200 of the array the newer it is in the sequence of display. The change in thickness or in line types of the borders 200 of the arrays is considered a visual distinctive feature because it graphically discriminates the arrays. This is one example of a discriminating visual feature that is usable to distinguish one array from another.

Figure 4:
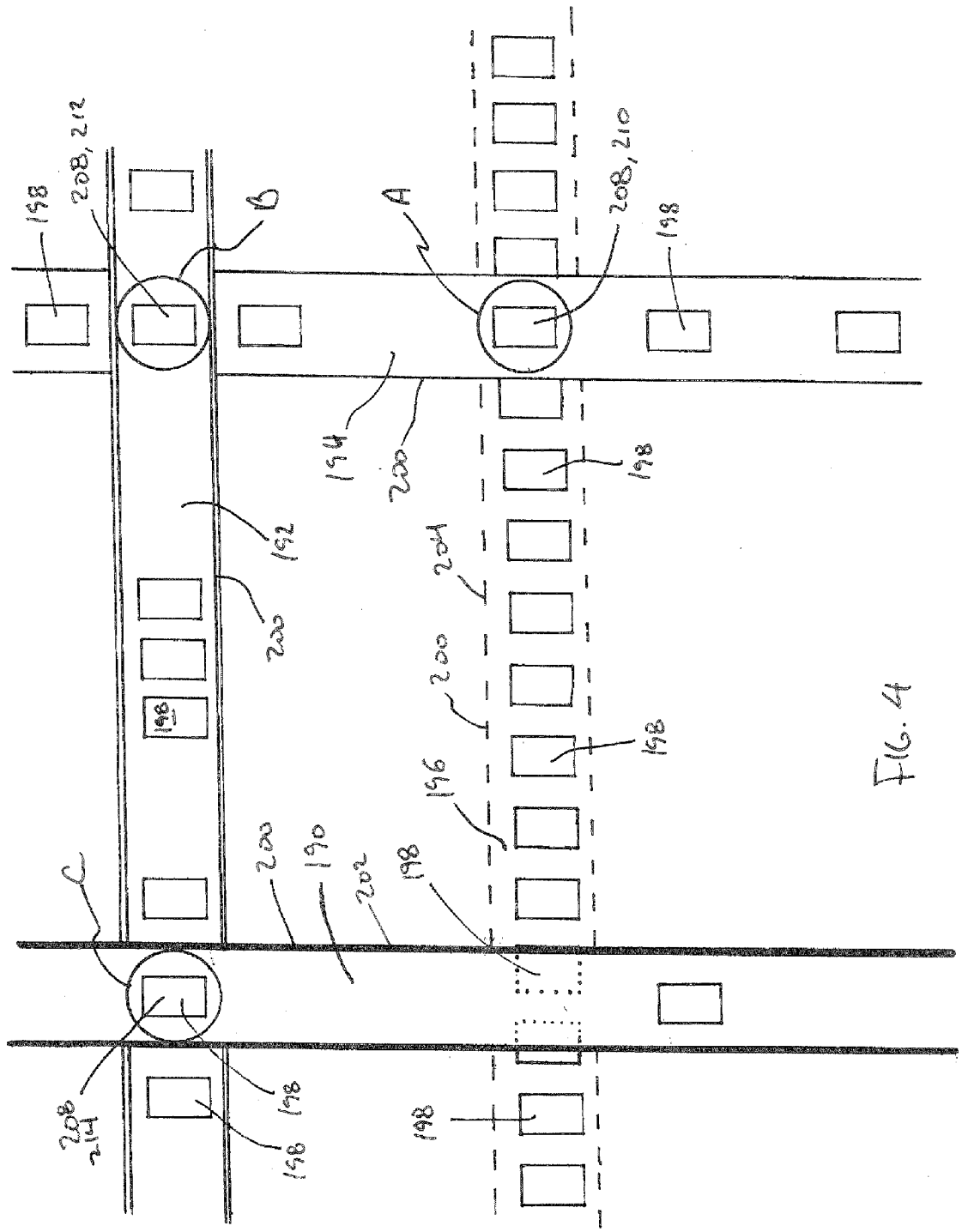
FIG. 4 is a schematic view of four arrays of documents illustrated with a discriminating feature in accordance with an embodiment of the present invention.

The color and the texture of the array are other ways to distinguish one array from another. The brightness of the arrays could vary thus helping a user to infer their sequence of display. A perspective view of the arrays is also within the scope of the present invention by changing the size/depth of each array of documents so that the most recent array is either bigger, in front and/or brighter than the second newer and so on so forth. FIG. 4 illustrates a type of perspective where the arrays overlapping indicate which one has been first displayed. However, on FIG. 4, the width of the arrays 190, 192, 194, 196 remains even to ensure a similar level of details of documents on all arrays 190, 192, 194, and 196.

Figure 5:
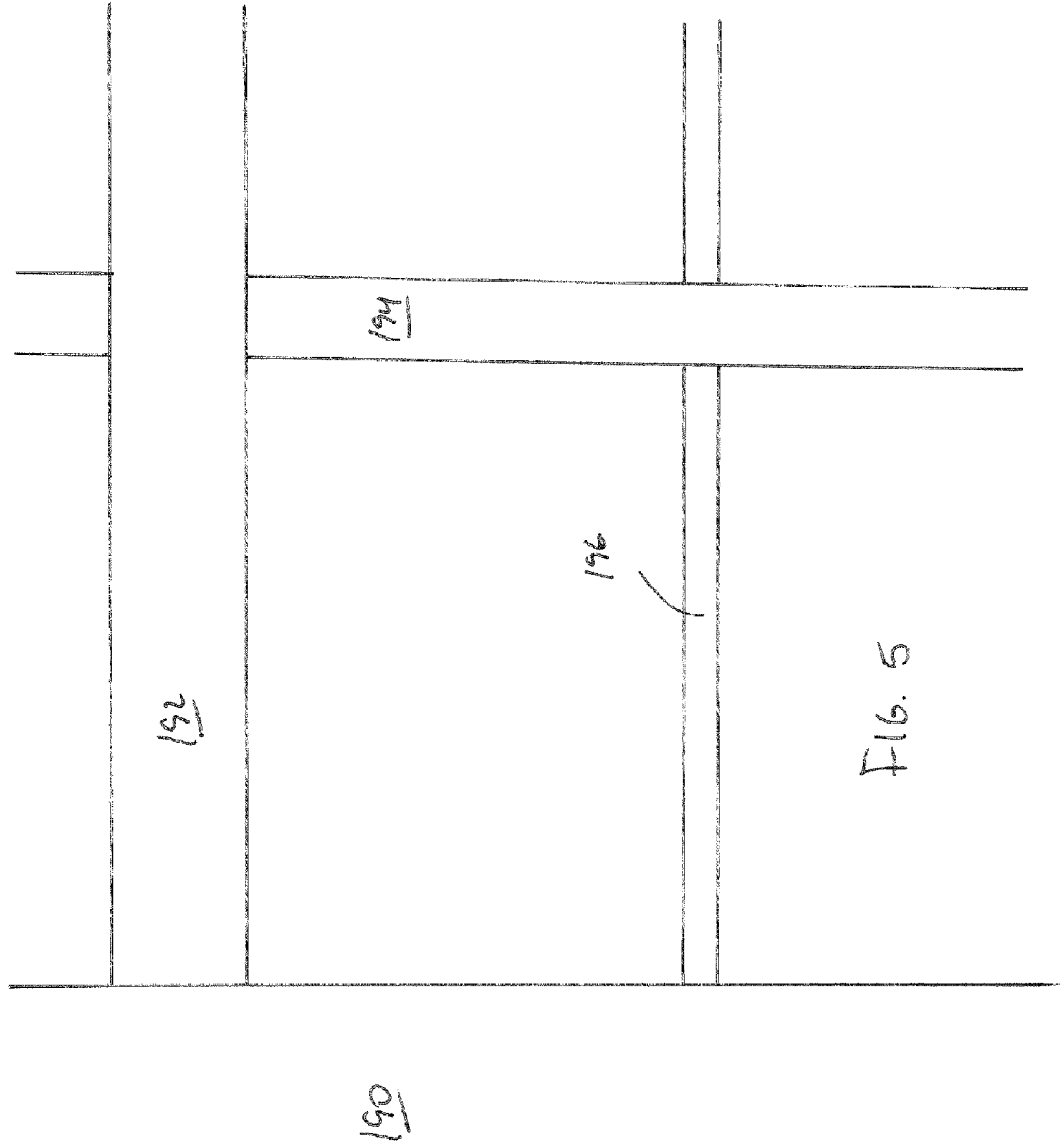
FIG. 5 is a schematic view of four arrays of documents illustrated with a discriminating feature in accordance with an embodiment of the present invention.

On the other hand, as illustrated on FIG. 5, the arrays 190, 192, 194, 196 can be displayed with a perspective influencing the width of each arrays 190, 192, 194, 196 such that the oldest displayed array, array 196, is the smallest displayed, analogous to objects on a landscape where the further they are the smallest the objects are. The change in width can be made progressively so the viewer can appreciate the modifications on the arrays' layout.

Returning to FIG. 4, it is possible to see what could look like a progressive enablement of invisibility to an array of document that is over the maximum number of displayable arrays. Illustratively, the maximum number of displayable arrays of documents is three (3). Array 196 was first displayed in the sequence, then array 194 and, lastly, array 192. A new array 190 is enabled and displayed. Array 196 is then over the maximum number of displayable array of documents and must become invisible. The newly displayed array 190 is the darker 202 of all arrays that are displayed. Conversely, the older array 196 is in the process of becoming invisible as depicted by the fine dotted lines 204 that will become, with the documents disposed thereon, lighter and lighter until they reach invisibility and leave only three arrays displayed in accordance with the preset maximum number of displayable arrays. This progressive array invisibility enablement might be preferable to provide an observer a mean to perceive and understand what changes are occurring as opposed to provide an instant new layout leaving the observer with very little help to appreciate the modifications in the arrays' layout.

Additional discriminating visual feature will be appreciated by skilled reader and are considered to fall within the scope of the present application.

FIG. 4 also illustrates logical intersections A, B, C illustrated by circles. A logical intersection between two or more arrays of documents is enabled by a commonality between the arrays. In the present situation a document 208 is found in the logical intersection.

A logical intersection can be created in various ways. For instance, document 210 on array of documents 196 is associated with various attributes (or tags, categories . . . ). One attribute is selected from document 210 and array of documents 194 is enabled displaying documents having the selected attribute from document 210 in common. The selected attribute is the commonality and the document 210 becomes the physical logical intersection A between arrays of documents 196 and 194. The same process is repeated for logical intersection B and C.

The enablement of the logical intersections A, B, C is made in the course of navigating array 196, 194, 192, respectively. The logical intersections A, B, C are then enabled with a sequence of logical intersection enablement because they were created one after the other the other with the creation of the arrays 196, 194, 192. This sequence of logical intersection enablement is also a way to limit the number of displayed arrays of documents. Similarly to what was explained with FIG. 3 in regard to a maximum number or arrays of documents, a maximum number of logical intersections can be used as basis for deciding which array of documents remains displayed.

Another feature can be illustrated with FIG. 4. Let's assume the maximum number of logical intersections is two (2). Array 196 is first displayed, logical intersection A is enabled with the displaying of array 194, then logical intersection B with document 212 leading to array 192. At this point we have displayed the maximum number of logical intersections allowed. Then document 214 is the base of a third logical intersection C. Logical intersection A must then become invisible. This happens by rendering invisible the "base" array 196 while leaving displayed "intersecting" array 194. With the absence of the base array 196 the intersection, and the logical intersection by the same time, automatically disappears.

Now array of document 190 is displayed but a user wants to come back to the previous array 196 that is now invisible. A function analogous to the "forward" and "back" functions of an Internet browser, such as Internet Explorer from Microsoft Corporation, allows to "come-back-to-previous-logical-intersection" B, then, if the come-back-to-previous-logical-intersection function is activated a second time, it comes back to logical intersection A thus rendering invisible array 190 and bringing back to visibility array 196 and logical intersection A. This provides a means for navigating along logical intersections, forwardly and rearwardly, while keeping only the maximum number of displayed logical intersections displayed. This navigation process can be used for navigating over a significant number of logical intersections along their associated arrays of documents without overcrowding the display. Despite the invisible arrays are not displayed, they remain on memory so that they can be recalled by the computer system if requested by the user.

The maximum number of arrays of documents or the maximum number of logical intersections varies according to the strength of the zoom providing the image on a display. The closer the view is, given a strong zoom-in, the smaller is the maximum number of displayable arrays of documents (or the maximum number of logical intersections). Conversely, the further the view is, given a strong zoom-out, the higher the maximum number of displayable arrays of documents (or the maximum number of logical intersections). This is customizable and a user/viewer could use the opposite logic if this is what works better for her/him without departing from the scope of the present invention.

Figure 6:
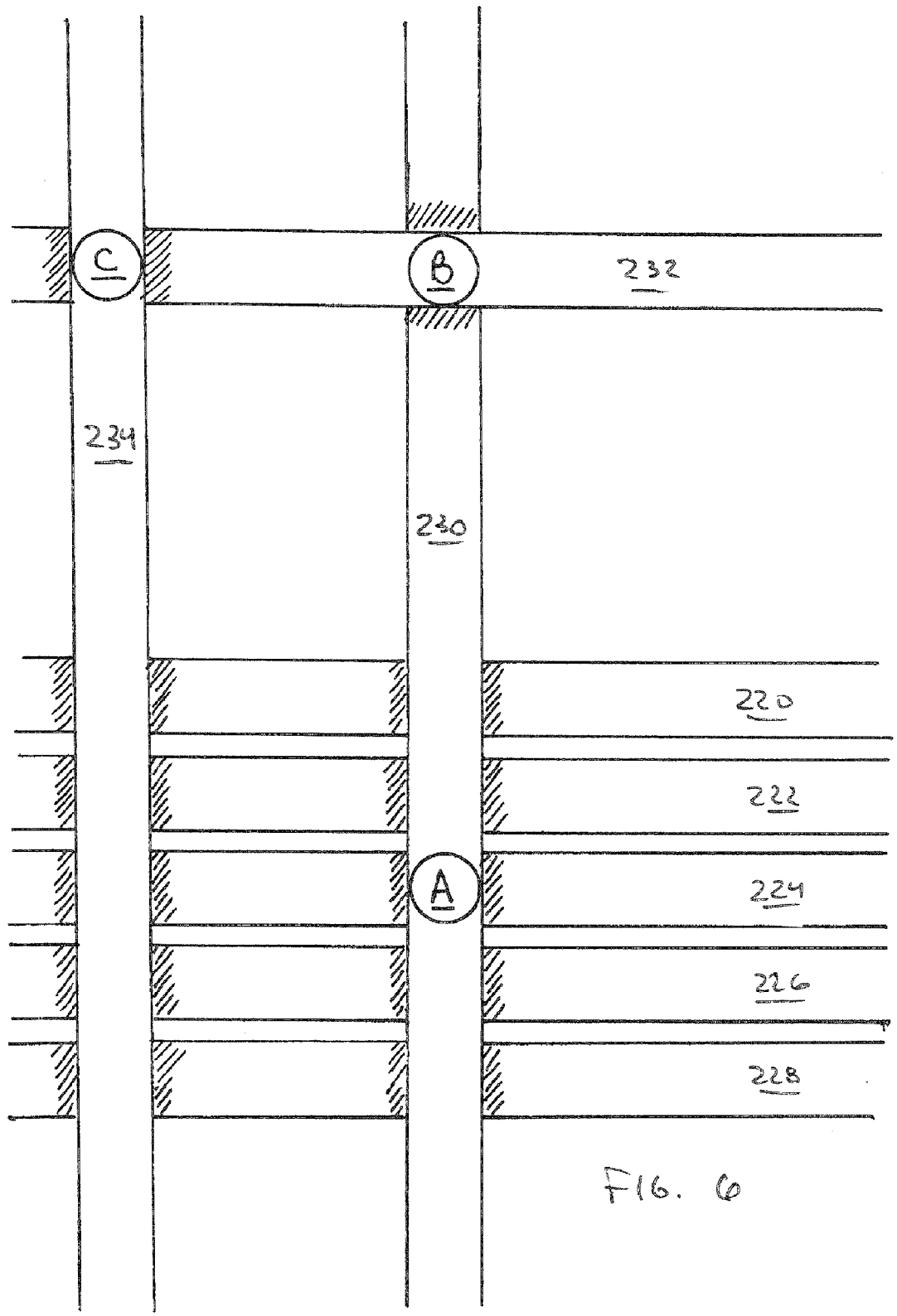
FIG. 6 is a schematic view of a plurality of arrays of documents illustrating, inter alia, logical intersections.

In the case of many parallel arrays of documents are displayed, like illustrated on FIG. 6, the maximum number of displayable arrays of documents could not consider the first series of parallel arrays of documents 220, 222, 224, 226, 228 as being five different arrays because the five parallel arrays are not really confusing to the viewer. Instead, the first set of five (5) parallel arrays is considered as a single array in the count of the maximum number of displayable arrays of documents. For example, array 220 is displaying documents about apples (the actual documents are not shown on FIG. 6 to lighten the figure), array 222 is displaying documents about oranges, array 224 documents about bananas, array 226 documents about grapes, document 228 documents about pineapples. Logical intersection A enables array 230 displaying "images" documents (i.e. JPG, BMP . . . ) of bananas because the attribute "image" is selected from a document from array 224 displaying documents having the attribute "banana". Along array 230 another attribute "Africa" is selected from an image document of an African breed of banana thus enabling the logical intersection B with the array 232 grouping documents having the attribute "Africa" in common. Along array 232 another attribute "Congo" is selected from a document related to "Congo" and having the attribute "Congo" associated therewith thus enabling the logical intersection C with the array 234 grouping documents having the attribute "Congo" in common. And so on so forth. If the maximum number of displayable logical intersections is set to two (2) then, when logical intersection C is enabled, the series of arrays of documents 220, 222, 224, 226, 228 will become invisible together as a group. It has to be noted that the intersections not identified with a circle are non-logical intersections and happens to appears because of the creations of arrays based on logical intersections A, B and C.

It can also be appreciated from FIG. 6 that shadows are used to emphasis arrays superposition given the perspective discriminating visual feature applied hereto.

Locked and Unlocked Logical Intersections

Figure 7:
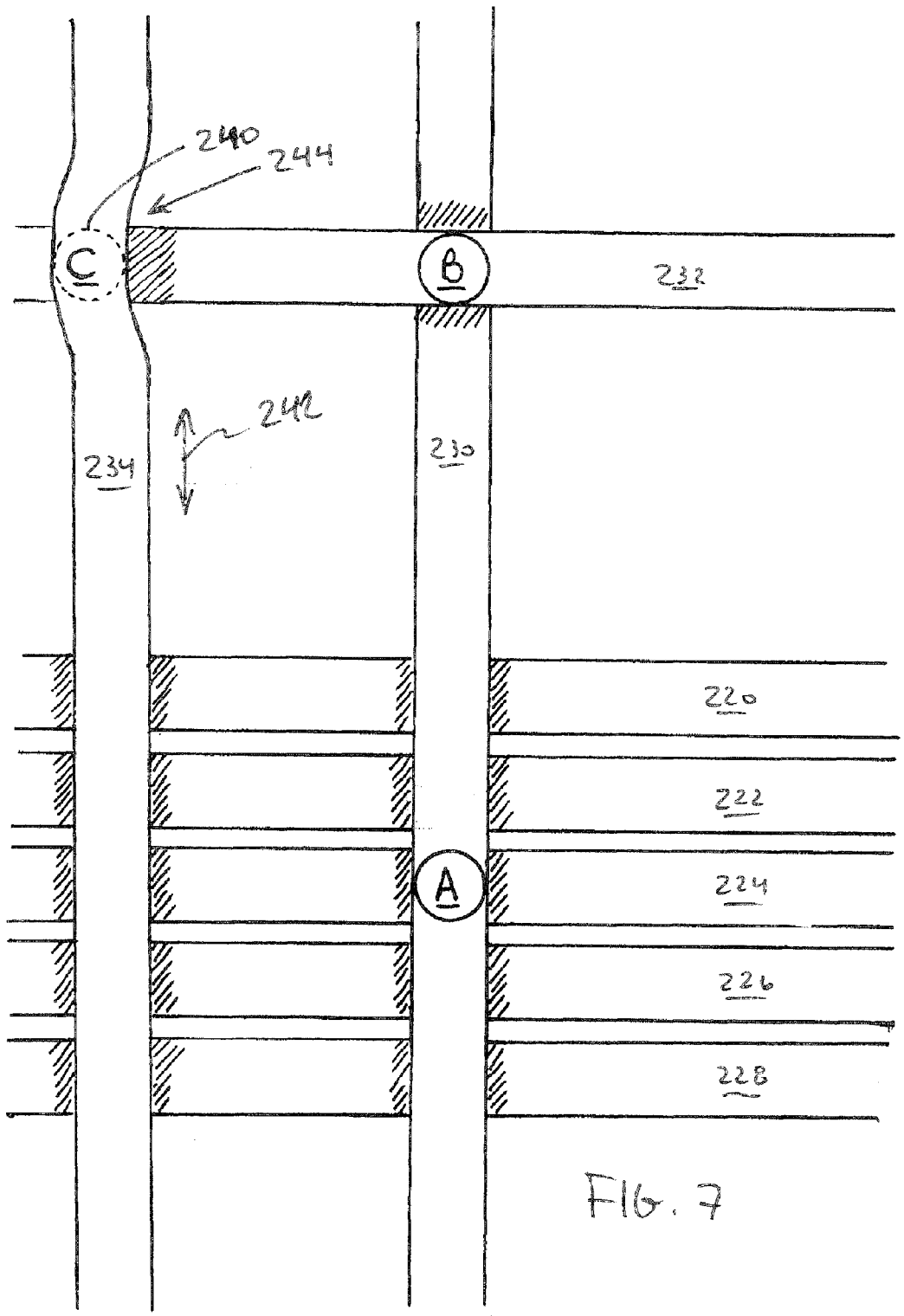
FIG. 7 is a schematic view of a plurality of arrays of documents illustrating, inter alia, an unlocked logical intersection.

Turning now to FIG. 7 where logical intersection C is "unlocked" as opposed to "locked" logical intersection A and B. The locked intersections A and B make those arrays 220, 222, 224, 226, 228, 232 are all moving together when one array is moved. Conversely, when a logical intersection is unlocked, like logical intersection C identified with a circle in dotted line 240, the unlocked array 234 can move independently of the other arrays. On FIG. 7, the array 234 can move along its axis as identified by arrow 242. Right clicking on the subject logical intersection to change the status of the logical intersection in the dialog to "unlocked" unlocks the logical intersection. An unlocked logical intersection can be locked again using the same dialog. An animation can move the arrays to progressively reconnect the logical intersection and assists the understanding of the viewer about the change occurring on the display. Additionally, in order to ensure that a viewer clearly sees the unlocked array 234 is independently moveable from array 232, the unlocked array is shaped like a "bridge" 244.

Figure 8:
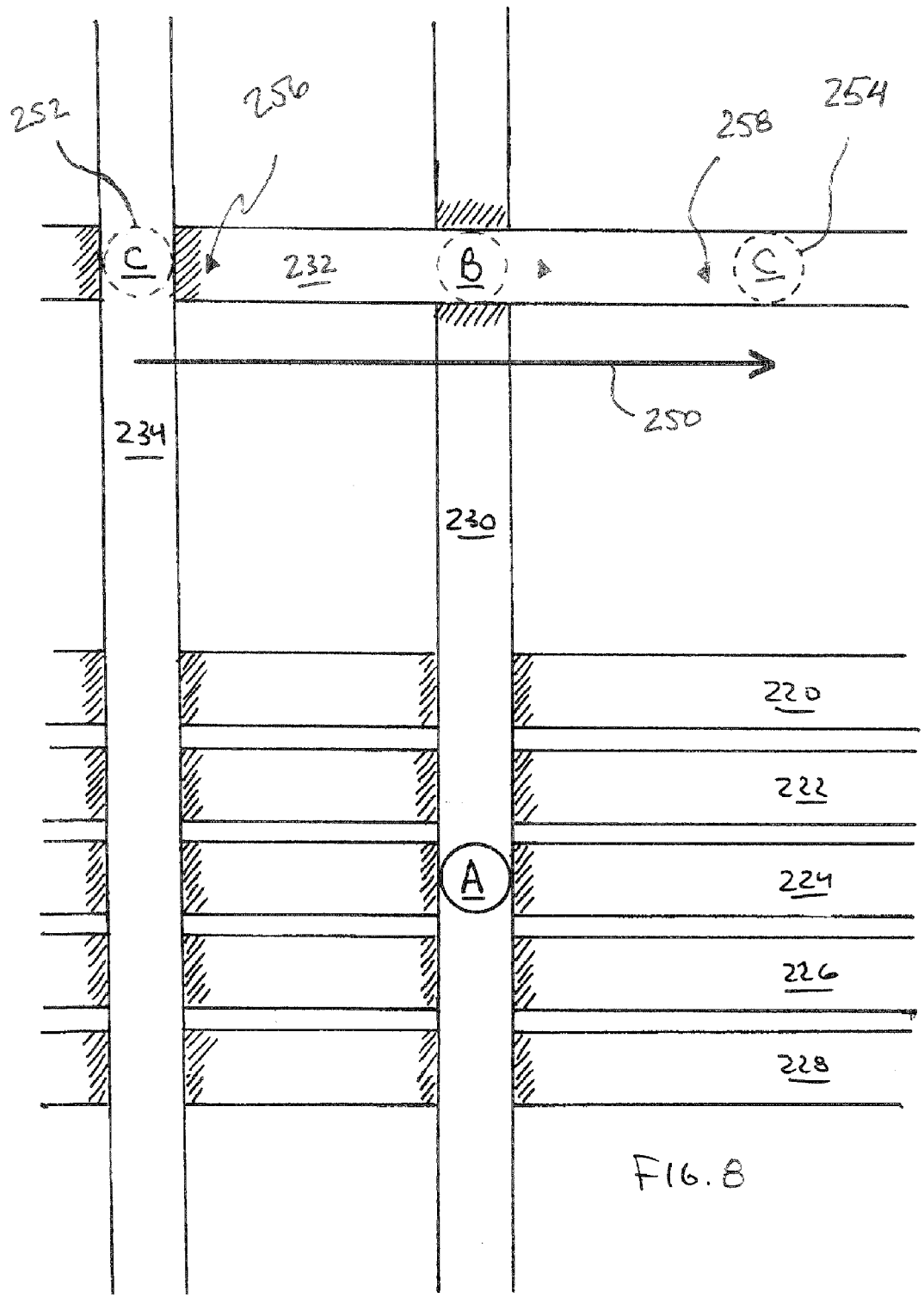
FIG. 8 is a schematic view of a plurality of arrays of documents illustrating, inter alia, a displaced unlocked logical intersection.

Comparing between FIG. 6 and FIG. 8, unlocked logical intersections B and C on FIG. 8 allow movement of the unlocked array 232 as identified with arrow 250. Unlocked logical intersections B and C identified with the distinctive dotted circle 252 (disposed on the intersecting document that is not shown on the arrays) on array 230, are doubled with another associated dotted circle 254 on the displaced array 232 (although the doubled dotted circle of logical intersection B is outside the actual FIG. 8 and is therefore not visible). Both dotted circles 252, 254 are completing each other and are superposed at the same position when the two arrays are locked and assembled. Array 232 is displaced and both portions of the logical intersection circle 232, 234 are separated one from the other in accordance with the relative movement of the unlocked array 232. Arrows 256, 258, facing each other, are disposed next to the unlocked logical intersections 252, 254 to assist a viewer to determine on which side is the other cooperating logical intersection dotted circle. A selection of the arrow 256 leads to the other cooperating dotted circle. This is helpful when the other portion of the unlocked logical intersection is outside of the display to know on which side navigation must be done along array 232 to reach the other cooperating logical intersection dotted circle. It has to be noted that the logical intersection representation uses a circle and dotted circles, however, other means to distinguish the logical intersections is considered to be within the scope of the present invention.

Still on FIG. 8, if logical intersection B has been locked, and therefore represented with a solid circle, the movement of array 232 in respect with array 234 would have also moved array 230 and array 224.

Figure 9:
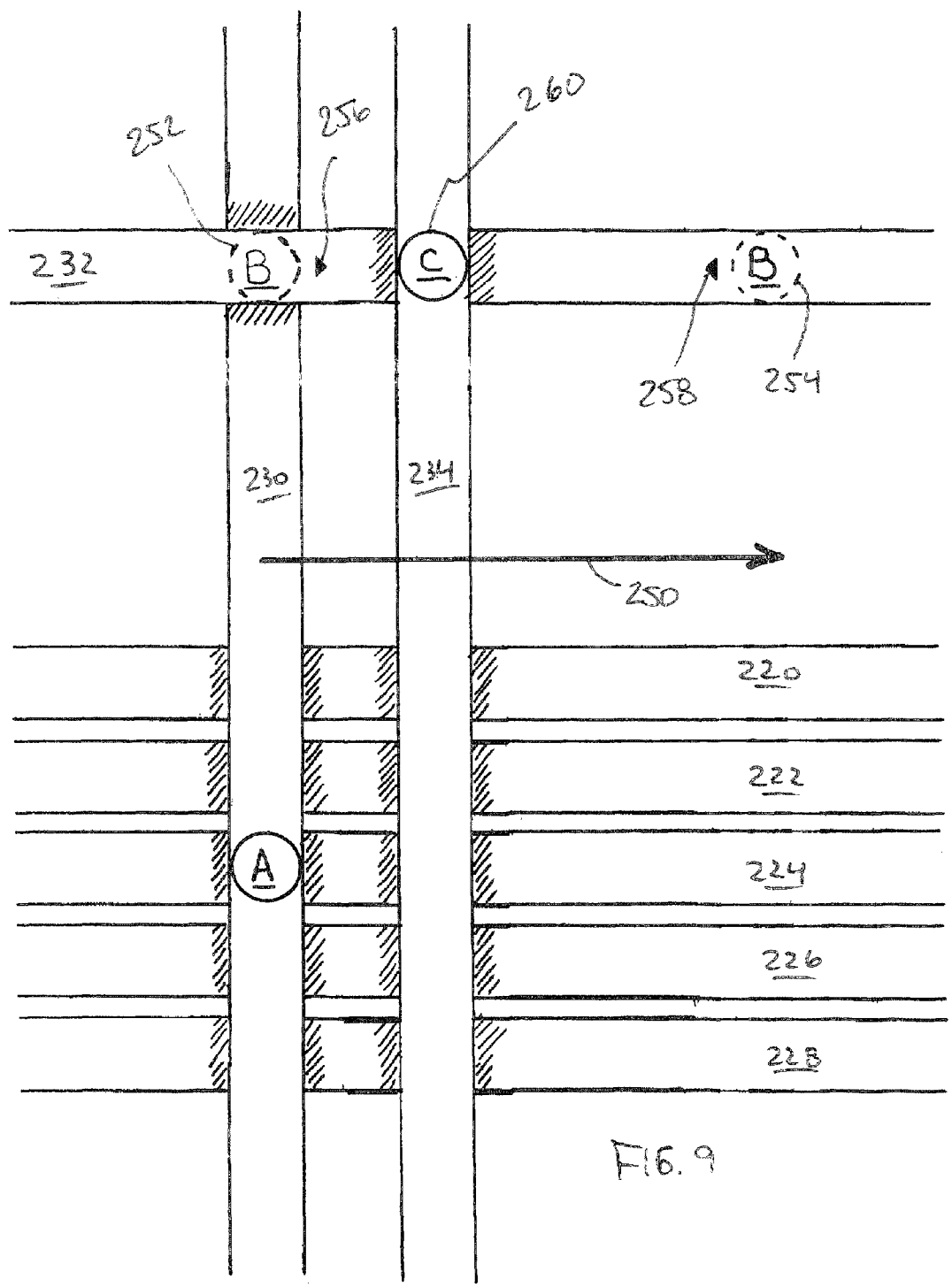
FIG. 9 is a schematic view of a plurality of arrays of documents illustrating, inter alia, a displaced array based on an unlocked logical intersection.

FIG. 9 illustrates an example of movement of an associated array. Logical intersection B in unlocked 252 while logical intersection C remains locked 260. In array 232 moves in respect to array 230, array 230 remains at its position because the logical intersection between both arrays 230, 232 is unlocked 252. Although array 234 moved along with array 232 because its logical intersection C is locked 260 with array 232.

Array and Document Dialogs

Figure 10:
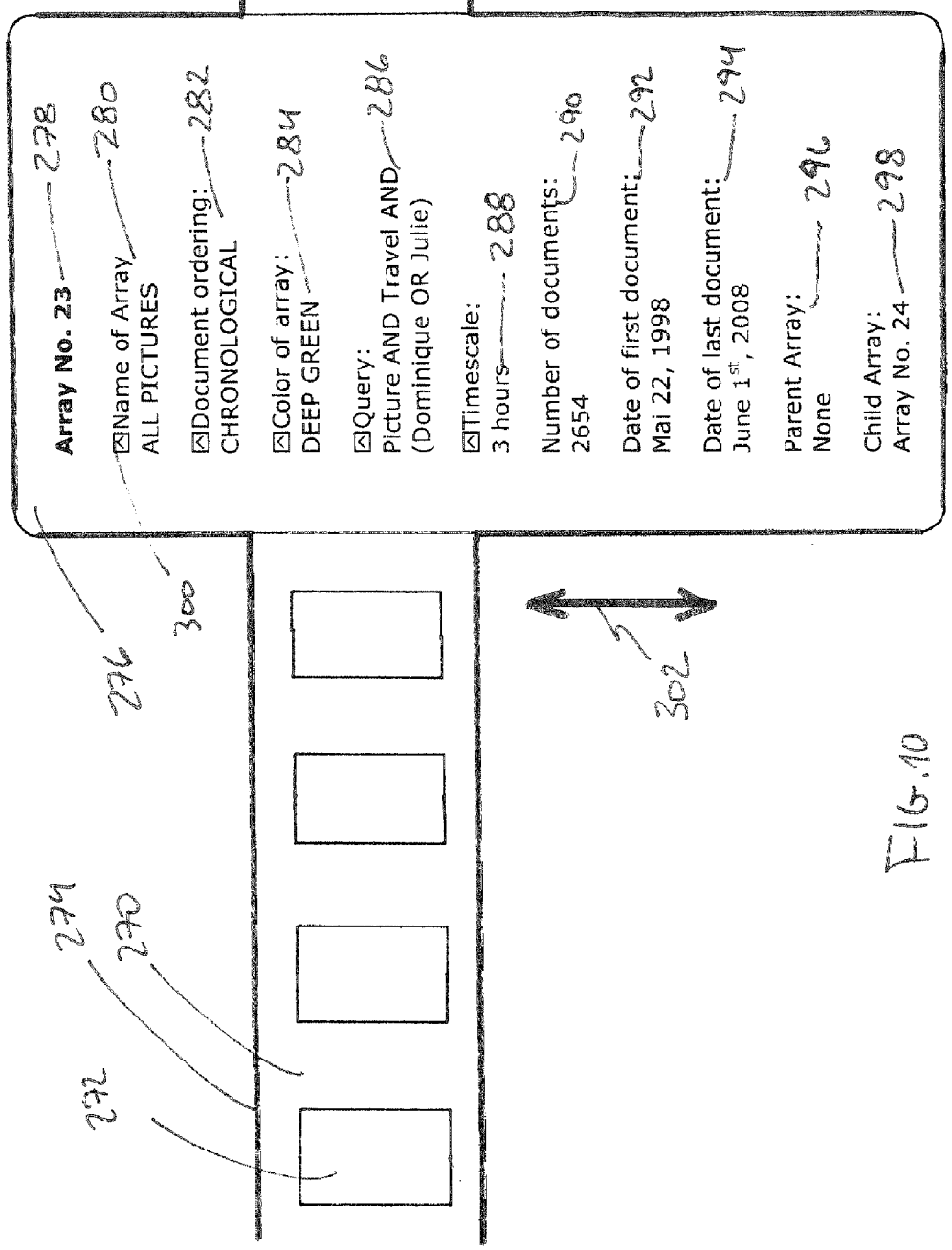
FIG. 10 is a schematic view of an interactive array dialog.

Turning now to FIG. 10 where a dialog 276 providing a dialog 276 is illustrated. The menu 276 relates to the array 274. Array 274 is illustrated with a few documents 272 disposed thereon and an array background 270. It is shown as being graphically connected to its related array 274 but could be produced to the viewer using a different fashion. The array dialog 276 is a dialogue allowing the viewer to be informed of a number of significant information in relation with the array 247.

The dialog 276 provides, inter alia, the following information. The array identification with the default, preferably sequential, array number 278, the name of the array 280 attributed by the user, the color or the texture of the array background, 284, 270, the query 286 at the base of the documents filtering that determines which documents will be displayed on the array, the timescale 288 used for presenting the documents on the array 274, the number of documents 290 present on the array 274, if applicable, the date of the first document 292 present on the array 274 (in the event a chronological order is used otherwise it might be omitted), the date of the last document 294 present on the array 274 (here again it might be omitted as described earlier), a list of parent arrays 296 when parent arrays exist, a list of child arrays 298 when child arrays exist.

When useful, the information depicted on the array dialog 276 is editable. The user can change the value of the edited information preferably through a drop down menu 300, a picker or other adapted means to modify the value. In the illustrative embodiment of FIG. 10 the name of the array 280, the documents ordering 282, the color of the array background 284, the query 286 and the timescale 288 can be modified by the user through the dialog 276 without modifying the documents on the array 274.

The array name 280 is written on the array's background 270 so that the user always sees the name 280. The document ordering 282 can be changed to use other statistically related ordering (e.g. most recent viewed, document size, most viewed documents . . . ). The color 284 can be changed using a color picker that also memorizes the most used colors or preferred colors of the user. The query 286 can be edited and modified. In the present example the query could be modified to add a specific duration of time, let's say between Jan. 1, 1998 and Dec. 31, 2003. The query could also be changed; let's say the exemplary modified query is: E-mail AND Travel AND New-Zealand.

The array dialog 276 can be locked to the array 274 to which it relates. When the array dialog 276 is locked the menu remains connected, only vertically as indicated with arrow 302 or both vertically and horizontally as indicated with arrow 304, to the array 274. Conversely, when the array dialog 276 is unlocked, the array dialog 276 appears like a floating window and remains visible on the display if the array 274 is moved. A graphical link between the array and its related array dialog is desirable to make sure the user clearly perceive the link.

FIG. 11 illustrates an array of document 310 with a single document 312. A "mouse over" document dialog 314 is displayed in a pop-up window 316 or in a floating window. The pop-up dialog 316 displays relevant information in addition to allow edition of the information and selection of attributes without having to change the zoom level of the array 310. A delay can be predetermined by the user so that the pop-up dialog 316 only pops up after the predetermined delay once the pointing device has identified the subject document.

The document dialog 314 is normally displayed when the document 312 on the array 310 is in a size that does not allow a clear view of the information associated therewith or if the user chooses by default not to see the information related to the document 312. For instance, if the document 312 is in a thumbnail or icon size, then, the document is not large enough to distinguish the associated information. In contrast, if the document 312 is large enough to see the information associated thereto and the user has decided not to see the information thereon, then, the pop-up window 316 will alternatively show the information. The size threshold enabling pop-up windows 316 is also predetermined by the user.

The pop-up dialog 316 provides information about the document 212, selectable attributes 324 and a thumbnail of the document if needed (thumbnail not displayed though on FIG. 10). The document number 318 is displayed on top of the pop-up dialog 316 followed by the title 320 that is editable using the dedicated edit button 322. A list of attributes 324 associated with the document 312 is illustrated. A scroll bar can be added if the number of information or the number of attributes is too large to be completely displayed on the pop-up dialog 316. The attributes 324 are selectable through either a button 326 or a simple selectable text (not shown) with the pointing device 328. Some attributes are editable 330 right from the pop-up menu 316. A summary 332 is displayed with the date of the document 334. A note associated with the document or other relevant information 336 about the document 312 and the relations the document 312 has with other documents can be displayed in the pop-up menu window 316.

To ensure each pop-up dialog 316 is associated correctly with the document it relates to, a visual mark 336 connects the pop-up dialog 316 with the document 312. The pop-up dialog 316 can be moved on the display to allow the user to free a desired area of the display. The pop-up dialog 316 can also be automatically activated from a predetermined zoom level. This will prevent the pop-up dialog 316 to open when the document 312 is large enough to provide the information to the user.

Alternatively, a floating window can remain open on the display and be used as a magnifier to display the information of a document the pointing device is hovering over. The floating window remains open and the content of the floating window changes in correspondence with the pointed document.

Also, the pop-up dialog 316 could present the equivalent of the specific interface associated with the document 312 and visible when the document 312 is large enough to display the specific interface.

The present invention also covers a machine-readable medium comprising machine-readable instructions providing a method for discriminating arrays of user-selectable elements comprising: displaying an array of user-selectable elements; selecting an array background associable with the array of user-selectable elements; displaying the array with the selected array background such that the array of user-selectable elements is visually distinctive.

The computer-readable medium comprising computer-readable instructions providing a method for discriminating arrays of user-selectable elements of claim, wherein the array of user-selectable elements groups user-selectable elements having an attribute in common, the background comprises, at least in part, a name of the attribute in common.

The description and the drawings that are presented above are meant to be illustrative of the present invention. They are not meant to be limiting of the scope of the present invention. Modifications to the embodiments described may be made without departing from the present invention, the scope of which is defined by the following claims.

What is claimed is:

1. A non-transitory computer-readable medium having stored thereon computer-readable instructions that, when executed by a computer, cause the computer to perform operations for graphically distinguishing axes of user-selectable icons representing respective items of contents on a display, the operations comprising:

displaying, at a first time, about a time-of-axis-display timeline, a first axis of user-selectable icons substantially rectilinearly displaying user-selectable icons in a first specific direction along a first order thereof;

receiving an input provided on a basis of an action performed in connection with a relational user-selectable icon from the first axis of user-selectable icons;

providing a plurality of user-selectable icons on a basis of the received input; and displaying, at a second time about the time-of-axis-display timeline, chronologically following the first time about the time-of-axis-display timeline at which the first axis of user-selectable icons was displayed, a second axis of user-selectable icons substantially rectilinearly displaying user-selectable icons along a second order thereof, the second axis of user-selectable icons being displayed in a second specific direction at an angle in respect with the first specific direction of the first axis, the first axis and the second axis intersecting, or abutting, at the relational user-selectable icon on a single plane, the second axis being displayed at the second time along the time-of-axis-display timeline, the relational user-selectable icon including a locked configuration connecting movements between the first axis of user-selectable icons and the second axis of user-selectable icons and an unlocked configuration disconnecting movements between the first axis of user-selectable icons and the second axis of user-selectable icon to provide independent longitudinal scrolling of the first axis of user-selectable icons and the second axis of user-selectable icons, the locked configuration and the unlocked configuration being user selectable, wherein the first axis of user-selectable icons and second axis of user-selectable icons are concurrently displayed on a basis of the time-of-axis-display timeline in such a way as to graphically distinguish with a graphically created depth of view the first axis of user-selectable icons from the second axis of user-selectable icons to indicate to a viewer of the display that the first axis of user-selectable icons was displayed chronologically before the second axis of user-selectable icons is displayed.

2. The non-transitory computer-readable medium of claim 1, wherein the second axis of user-selectable icons is displayed in such a way as to at least partially overlap the first axis of user-selectable icons.

3. The non-transitory computer-readable medium of claim 1, wherein the first axis of user-selectable icons and the second axis of user-selectable icons are displayed in such a way as to render a perspective representing a spatial relationship between the first axis of user-selectable icons and the second axis of user-selectable icons on the display representative of the sequential axes display order of the first axis of user-selectable icons and the second axis of user-selectable icons.

4. The non-transitory computer-readable medium of claim 1, wherein the two consecutively displayed axes of user-selectable icons are displayed in non-parallel relation to one another.

5. The non-transitory computer-readable medium of claim 4, wherein an intersection area between the first axis of user-selectable icons and the second axis of user-selectable icons is accentuated in the display thereof.

6. The non-transitory computer-readable medium of claim 1, wherein the intersection, or abutment, between the first axis of user-selectable icons and the second axis of user-selectable icons is displayed in such a way as to indicate if the relational user-selectable icon is in the locked configuration or in the unlocked configuration.

7. The non-transitory computer-readable medium of claim 1, further comprising:

displaying, at a time subsequent to a time of display of a most recently displayed axis of user-selectable icons, an additional axis of user-selectable icons, the additional axis of user-selectable icons being displayed at the subsequent time along the time-of-axis-display timeline with a graphical discrimination of the most recently displayed axis of user-selectable icons first preceding the display of the additional axis of user-selectable icons; and ceasing displaying of the first axis of user-selectable icons based on a determination that a number of displayed axes of user-selectable icons would exceed a predetermined number of axes of user-selectable icons to be displayed at one time, wherein the remaining displayed axes of user-selectable icons, after ceasing to display the first axis of user-selectable icons, are displayed at the same time in such a way as to indicate the chronological order in which the remaining axes of user-selectable icons were displayed on a basis of the time-of-axis-display timeline.

8. The non-transitory computer-readable medium of claim 7, wherein ceasing displaying of the first axis of user-selectable icons comprises rendering the first axis of user-selectable icons invisible in such a manner that the first axis of user-selectable icons may be redisplayed later.

9. The non-transitory computer-readable medium of claim 7, wherein the operations further comprise:

receiving instructions adapted to perform a sequential navigation between displayed axes of user-selectable icons, wherein a displayed axis of user-selectable icons is adapted to become invisible and an invisible axis of user-selectable icons is adapted to become visible as a result of navigation between two displayed axes of user-selectable icons so as not to display more than the predetermined number of axes of user-selectable icons to be displayed at one time.

10. A method of graphically distinguishing axes of user-selectable icons representing respective items of contents on a display, the method comprising:

displaying, at a first time about a time-of-axis-display timeline, a first axis of user selectable icons substantially rectilinearly displaying user-selectable icons in a first specific direction along a first order thereof;

receiving an input provided on a basis of an action performed in connection with a relational user-selectable icon from the first axis of user-selectable icons;

providing a plurality of user-selectable icons on a basis of the received input; and displaying, at a second time about the time-of-axis-display timeline, chronologically following the first time about the time-of-axis-display timeline at which the first axis of user selectable icons was displayed, a second axis of user-selectable icons substantially rectilinearly displaying user-selectable icons along a second order thereof, the second axis of user-selectable icons being displayed in a second specific direction at an angle in respect with the first specific direction of the first axis, the first axis and the second axis intersecting, or abutting, at the relational user-selectable icon on a single plane, the second axis being displayed at the second time along the timeof-axis-display timeline, the relational user-selectable icon including a locked configuration connecting movements between the first axis of user-selectable icons and the second axis of user-selectable icons and an unlocked configuration disconnecting movements between the first axis of user-selectable icons and the second axis of user selectable icon to provide independent longitudinal scrolling of the first axis of user-selectable icons and the second axis of user-selectable icons, the locked configuration and the unlocked configuration being user selectable, wherein the first axis of user-selectable icons and second axis of user-selectable icons are concurrently displayed on a basis of the time-of-axis-display timeline in such a way as to graphically distinguish with a graphically created depth of view the first axis of user-selectable icons from the second axis of user-selectable icons to indicate to a viewer of the display that the first axis of user-selectable icons was displayed chronologically before the second axis of user-selectable icons is displayed.

11. The method of discriminating axes of documents on a display of claim 10, wherein the second axis of user-selectable icons is displayed in such a way as to at least partially overlap the first axis of user-selectable icons.

12. The method of discriminating axes of documents on a display of claim 11, wherein the intersection, or abutment, between the first axis of user-selectable icons and the second axis of user-selectable icons is displayed in such a way as to indicate if the relational user-selectable icon is in the locked configuration or in the unlocked configuration.

13. The method of discriminating axes of documents on a display of claim 10, wherein the first axis of user-selectable icons and the second axis of user-selectable icons are displayed in such a way as to render a perspective representing a spatial relationship between the first axis of user-selectable icons and the second axis of user-selectable icons on the display representative of the sequential axes display order of the first axis of user-selectable icons and the second axis of user-selectable icons.

14. The method of discriminating axes of documents on a display of claim 10, wherein the two consecutively displayed axes of user-selectable icons are displayed in non-parallel relation to one another.

15. The method of discriminating axes of documents on a display of claim 14, wherein an intersection area between the first axis of user-selectable icons and the second axis of user-selectable icons is accentuated in the display thereof.

16. The method of discriminating axes of documents on a display of claim 10, further comprising:
    displaying, at a time subsequent to a time of display of a most recently displayed axis of user-selectable icons, an additional axis of user-selectable icons, the additional axis of user-selectable icons being displayed at the subsequent time along the time-of-axis-display timeline with a graphical discrimination of the most recently displayed axis of user-selectable icons first preceding the display of the additional axis of user-selectable icons; and
    ceasing displaying of the first axis of user-selectable icons based on a determination that a number of displayed axes of user-selectable icons would exceed a predetermined number of axes of user-selectable icons to be displayed at one time, wherein the remaining displayed axes of user-selectable icons, after ceasing to display the first axis of user-selectable icons, are displayed at the same time in such a way as to indicate the chronological order in which the remaining axes of user-selectable icons were displayed on a basis of the time-of-axis-display timeline.

17. The method of discriminating axes of documents on a display of claim 16, wherein ceasing displaying of the first axis of user-selectable icons comprises rendering the first axis of user-selectable icons invisible in such a manner that the first axis of user-selectable icons may be redisplayed later.

18. The method of discriminating axes of documents on a display of claim 16, wherein the operations further comprise:
    receiving instructions adapted to perform a sequential navigation between displayed axes of user-selectable icons,
    wherein a displayed axis of user-selectable icons is adapted to become invisible and an invisible axis of user-selectable icons is adapted to become visible as a result of navigation between two displayed axes of user-selectable icons so as not to display more than the predetermined number of axes of user-selectable icons to be displayed at one time.

19. An information organizing system, comprising:
    a computing device having a (i) processor and (ii) non-transitory computer-readable medium containing computer-executable instructions for performing a method; and
    a display operatively connected to the computing device for displaying a graphical user interface to a user during performance of the method when the computer-executable instructions are executed;
    wherein the method includes the step of:
    displaying, at a first time about a time-of-axis-display timeline, a first axis of user-selectable icons substantially rectilinearly displaying user-selectable icons in a first specific direction along a first order thereof;
    receiving an input provided on a basis of an action performed in connection with a relational user-selectable icon from the first axis of user-selectable icons;
    providing a plurality of user-selectable icons on a basis of the received input; and
    displaying, at a second time about the time-of-axis-display timeline, chronologically following the first time about the time-of-axis-display timeline at which the first axis of user-selectable icons was displayed, a second axis of user-selectable icons substantially rectilinearly displaying user-selectable icons along a second order thereof, the second axis of user-selectable icons being displayed in a second specific direction at an angle in respect with the first specific direction of the first axis, the first axis and the second axis intersecting, or abutting, at the relational user-selectable icon on a single plane, the second axis being displayed at the second time along the time-of-axis-display timeline, the relational user-selectable icon including a locked configuration connecting movements between the first axis of user-selectable icons and the second axis of user-selectable icons and an unlocked configuration disconnecting movements between the first axis of user-selectable icons and the second axis of user selectable icon to provide independent longitudinal scrolling of the first axis of user-selectable icons and the second axis of user-selectable icons, the locked configuration and the unlocked configuration being user selectable,
    wherein the first axis of user-selectable icons and second axis of user-selectable icons are concurrently displayed on a basis of the time-of-axis-display timeline in such a way as to graphically distinguish with a graphically created depth of view the first axis of user-selectable icons from the second axis of user-selectable icons to indicate to a viewer of the display that the first axis of user-selectable icons was displayed chronologically before the second axis of user-selectable icons is displayed.

20. The information organizing system of claim 19, further comprising:

displaying, at a time subsequent to a time of display of a most recently displayed axis of user-selectable icons, an additional axis of user-selectable icons, the additional axis of user-selectable icons being displayed at the subsequent time along the time-of-axis-display timeline with graphical discrimination of the most recently displayed axis of user-selectable icons first preceding the display of the additional axis of user-selectable icons; and ceasing displaying of the first axis of user-selectable icons based on a determination that a number of displayed axes of user-selectable icons would exceed a predetermined number of axes of user-selectable icons to be displayed at one time, wherein the remaining displayed axes of user-selectable icons, after ceasing to display the first axis of user-selectable icons, are displayed at the same time in such a way as to indicate the chronological order in which the remaining axes of user-selectable icons were displayed on a basis of the time-of-axis-display timeline.

\* \* \* \* \*